US008159716B2

(12) United States Patent
Kondo et al.

(10) Patent No.: US 8,159,716 B2
(45) Date of Patent: Apr. 17, 2012

(54) IMAGE PROCESSING DEVICE PERFORMING IMAGE CORRECTION BY USING A PLURALITY OF SAMPLE IMAGES

(75) Inventors: Masaki Kondo, Toyoake (JP); Tomohiko Hasegawa, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 855 days.

(21) Appl. No.: 12/194,680

(22) Filed: Aug. 20, 2008

(65) Prior Publication Data

US 2009/0059251 A1 Mar. 5, 2009

(30) Foreign Application Priority Data

Aug. 31, 2007 (JP) ................................. 2007-226091
Aug. 31, 2007 (JP) ................................. 2007-226480

(51) Int. Cl.
*H04N 1/40* (2006.01)
*G03F 3/08* (2006.01)
*G06K 9/00* (2006.01)

(52) U.S. Cl. .......... 358/1.9; 358/518; 358/520; 382/167
(58) Field of Classification Search .............. 358/1.9, 358/537, 538, 540, 539, 520, 518, 501, 528; 382/167, 165, 164, 274, 282, 318
See application file for complete search history.

(56) References Cited

U.S. PATENT DOCUMENTS

| 5,210,600 | A | | 5/1993 | Hirata |
| 5,459,589 | A | * | 10/1995 | Ohnishi et al. .................. 358/518 |
| 5,539,426 | A | | 7/1996 | Nishikawa et al. |
| 5,680,230 | A | * | 10/1997 | Kaburagi et al. .............. 358/520 |
| 5,734,802 | A | | 3/1998 | Maltz et al. |
| 5,764,380 | A | | 6/1998 | Noguchi |
| 5,805,308 | A | | 9/1998 | Tanaka et al. |
| 6,072,914 | A | | 6/2000 | Mikuni |
| 6,333,752 | B1 | | 12/2001 | Hasegawa et al. |
| 6,646,760 | B1 | | 11/2003 | Hanihara |

(Continued)

FOREIGN PATENT DOCUMENTS

EP 1 648 158 A1 4/2006

(Continued)

OTHER PUBLICATIONS

U.S. Official Action dated Apr. 14, 2011 from related U.S. Appl. No. 12/202,971.

(Continued)

*Primary Examiner* — Madelein A Nguyen
(74) *Attorney, Agent, or Firm* — Scully, Scott, Murphy & Presser, PC

(57) ABSTRACT

An image processing device includes a first image inputting unit, a comprehensive first characteristic quantity data determining unit, a second image inputting unit, a second characteristic quantity data determining unit, and an image correcting unit. The first image inputting unit is configured so as to be capable of inputting a plurality of first images. The comprehensive first characteristic quantity data determining unit determines comprehensive first characteristic quantity data based on the plurality of first images inputted by the first image inputting unit. The second image inputting unit is configured so as to be capable of inputting a second image. The second characteristic quantity data determining unit determines second characteristic quantity data expressing a characteristic of the second image inputted by the second image inputting unit. The image correcting unit corrects the second image based on the comprehensive first characteristic quantity data and the second characteristic quantity data.

15 Claims, 15 Drawing Sheets

U.S. PATENT DOCUMENTS

| | | | |
|---|---|---|---|
| 6,757,427 B1 | 6/2004 | Hongu | |
| 6,801,334 B1 | 10/2004 | Enomoto | |
| 6,922,261 B2 | 7/2005 | Asano | |
| 7,145,597 B1 | 12/2006 | Kinjo | |
| 7,215,792 B2 | 5/2007 | Sharma et al. | |
| 7,283,247 B2 | 10/2007 | Okawa et al. | |
| 7,308,155 B2* | 12/2007 | Terada | 382/284 |
| 7,349,119 B2 | 3/2008 | Tsukioka | |
| 7,508,550 B2* | 3/2009 | Kameyama | 358/3.23 |
| 7,729,013 B2 | 6/2010 | Nishida | |
| 7,903,307 B2 | 3/2011 | Dai et al. | |
| 2002/0060796 A1 | 5/2002 | Kanno et al. | |
| 2003/0031375 A1 | 2/2003 | Enomoto | |
| 2003/0091229 A1 | 5/2003 | Edge et al. | |
| 2003/0128379 A1 | 7/2003 | Inoue | |
| 2003/0193582 A1 | 10/2003 | Kinjo | |
| 2004/0212808 A1 | 10/2004 | Okawa et al. | |
| 2005/0152613 A1 | 7/2005 | Okutsu | |
| 2005/0220347 A1 | 10/2005 | Enomoto et al. | |
| 2006/0001928 A1* | 1/2006 | Hayaishi | 358/518 |
| 2006/0140477 A1 | 6/2006 | Kurumisawa et al. | |
| 2006/0187477 A1 | 8/2006 | Maki et al. | |
| 2006/0238827 A1 | 10/2006 | Ikeda | |
| 2006/0256410 A1* | 11/2006 | Koie et al. | 358/540 |
| 2006/0257041 A1 | 11/2006 | Kameyama et al. | |
| 2006/0291017 A1* | 12/2006 | Moran et al. | 358/538 |
| 2007/0019260 A1 | 1/2007 | Tokie | |
| 2007/0070436 A1 | 3/2007 | Iwaki | |
| 2007/0080973 A1 | 4/2007 | Stauder et al. | |
| 2007/0177029 A1 | 8/2007 | Wada et al. | |
| 2007/0206206 A1* | 9/2007 | Kondo et al. | 358/1.2 |
| 2007/0292038 A1 | 12/2007 | Takemoto | |
| 2008/0002216 A1* | 1/2008 | Matsushima | 358/1.9 |
| 2008/0239410 A1 | 10/2008 | Hashii et al. | |
| 2009/0128871 A1 | 5/2009 | Patton et al. | |
| 2009/0244564 A1* | 10/2009 | Kondo et al. | 358/1.9 |
| 2010/0033745 A1* | 2/2010 | Dai et al. | 358/1.9 |

FOREIGN PATENT DOCUMENTS

| | | |
|---|---|---|
| JP | H05-119752 | 5/1993 |
| JP | H05-300531 | 11/1993 |
| JP | 5-342344 A | 12/1993 |
| JP | 6-133329 | 5/1994 |
| JP | 7-177366 A | 7/1995 |
| JP | 7-312720 A | 11/1995 |
| JP | H09-116740 | 5/1997 |
| JP | H09-172553 | 6/1997 |
| JP | H09-284583 | 10/1997 |
| JP | 9-325536 | 12/1997 |
| JP | 10-173947 | 6/1998 |
| JP | H10-149441 | 6/1998 |
| JP | H11-098374 | 4/1999 |
| JP | H11-185034 | 7/1999 |
| JP | H11-196258 | 7/1999 |
| JP | 2000-106623 | 4/2000 |
| JP | 2000-152268 | 5/2000 |
| JP | 2000-196904 A | 7/2000 |
| JP | 2001-051062 | 2/2001 |
| JP | 2001-061062 | 3/2001 |
| JP | 2001-160908 | 6/2001 |
| JP | 2002-171408 | 6/2002 |
| JP | 2003-108987 | 4/2003 |
| JP | 2003-187215 | 7/2003 |
| JP | 2003-296723 | 10/2003 |
| JP | 2004-007370 | 1/2004 |
| JP | 2004-054751 | 2/2004 |
| JP | 2004-343365 | 12/2004 |
| JP | 2004-350212 | 12/2004 |
| JP | 2005-182143 A | 7/2005 |
| JP | 2005-192158 | 7/2005 |
| JP | 2005-197996 | 7/2005 |
| JP | 2005-202469 | 7/2005 |
| JP | 2005-242535 | 9/2005 |
| JP | 2005-309651 | 11/2005 |
| JP | 2006-80746 | 3/2006 |
| JP | 2006-121695 | 5/2006 |
| JP | 2006-229537 | 8/2006 |
| JP | 2006-229811 A | 8/2006 |
| JP | 2006-303899 | 11/2006 |
| JP | 2007-89179 | 4/2007 |
| JP | 2007-208413 | 8/2007 |
| WO | WO 2006/036027 A1 | 4/2006 |

OTHER PUBLICATIONS

U.S. Official Action dated Apr. 18, 2011 from related U.S. Appl. No. 12/202,872.

U.S. Official Action dated Apr. 19, 2011 from related U.S. Appl. No. 12/200,472.

U.S. Official Action dated May 18, 2011 from related U.S. Appl. No. 12/202,986.

Japanese Office Action issued in Patent Application No. JP 2007-226090 on Apr. 12, 2011 together with English language translation from related U.S. Appl. No. 12/202,986.

Web-page from the Sitemaker website, together with English translation, May 11, 2007, http://www.nl-sitemaker.com/cgi-bin/nextone/sitemaker.cgi?mode=page=page2&category=4.

Web-page from a personal website, namely 'kappa teki denou kukkan', together with English translation, Apr. 12, 2001, http://kapp.cool.ne.jp/howto/cg/comic6.htm.

Manual for EPSON COLORIO PM-D770, together with English translation, Oct. 7, 2004.

Manual for CANOSCAN 8400F, together with English translation, Jul. 18, 2004.

Web-page from Hiroshima Prefecture Website, together with English translation, Mar. 31, 2005, http://www.work2.pref.hiroshima.jp/soho/a/a08/a08061.html.

Japanese Official Action dated Aug. 25, 2009 with English translation.

Japanese Official Action dated Sep. 8, 2009 with English translation.

U.S. Official Action dated Oct. 20, 2011 from related U.S. Appl. No. 12/202,885.

United States Office Action dated Oct. 25, 2011 received in related U.S. Appl. No. 12/202,986.

Japanese Official Action dated Jun. 7, 2011 together with an English language translation from JP 2007-226584 received in related U.S. Appl. No. 12/202,872, filed Sep. 2, 2008.

Japanese Official Action dated Jun. 7, 2011 together with an English language translation from JP 2007-226586 received in related U.S. Appl. No. 12/202,872, filed Sep. 2, 2008.

U.S. Final Official Action dated Sep. 29, 2011 from related U.S. Appl. No. 12/200,472.

U.S. Final Official Action dated Oct. 14, 2011 from related U.S. Appl. No. 12/202,872.

Office Action dated Aug. 9, 2011 received from the Japanese Patent Office from related Japanese Application No. 2007-226088 and U.S. Appl. No. 12/202,872, together with an English-language translation.

Official Action dated May 31, 2011 received from the Japanese Patent Office from related Japanese Application No. JP 2007-226091, together with a partial English-language translation.

* cited by examiner

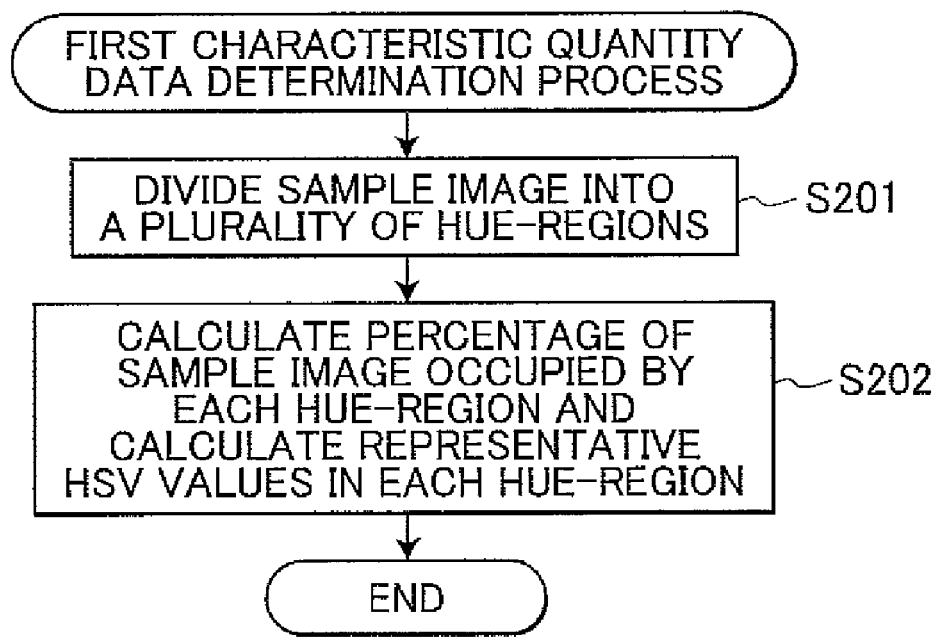
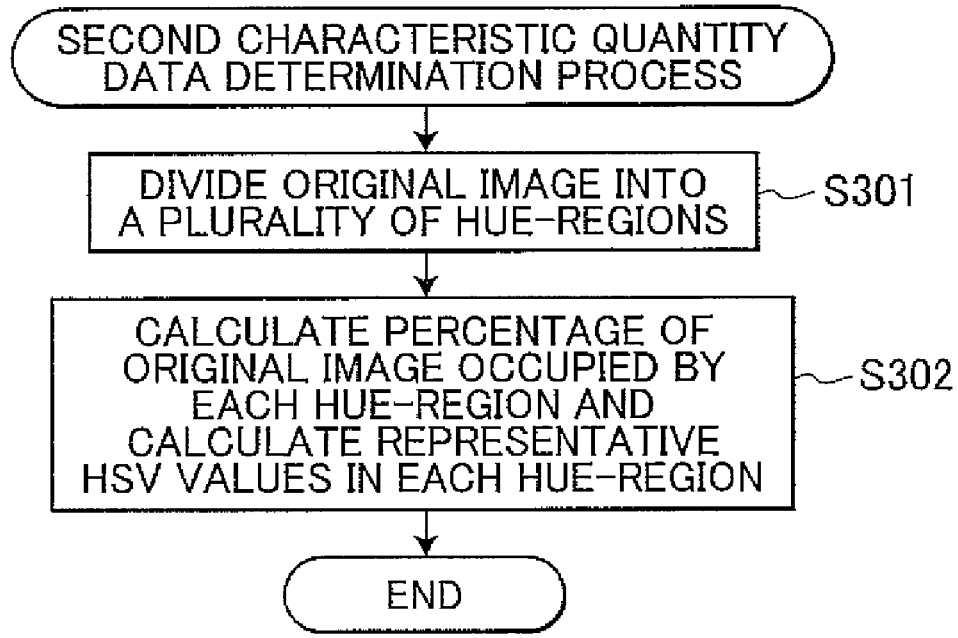

HUE CORRECTION TABLE

FIG.19
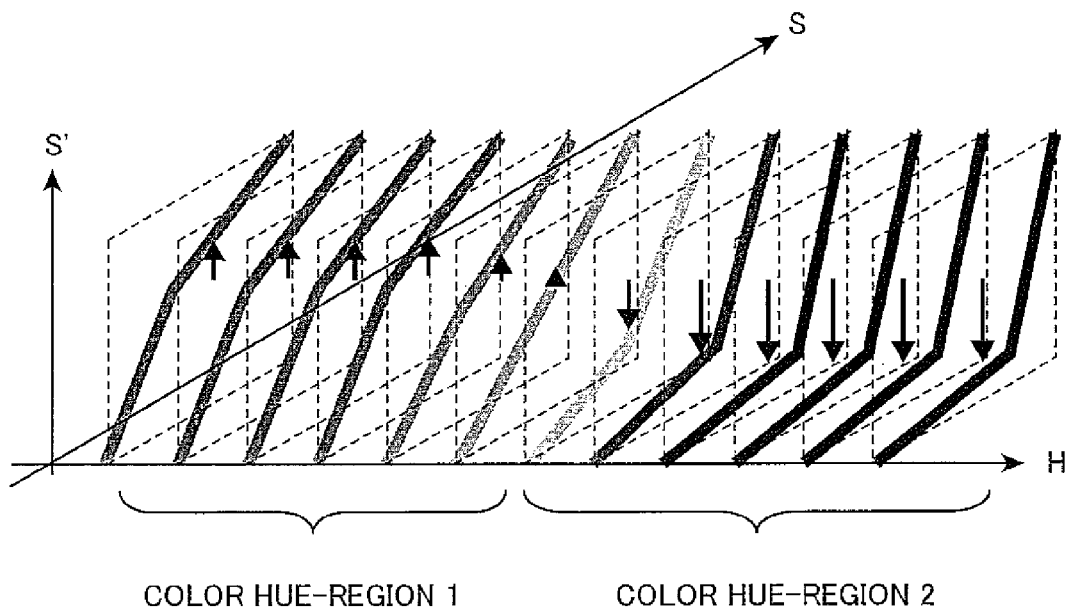
COLOR HUE-REGION 1    COLOR HUE-REGION 2
FIG.20
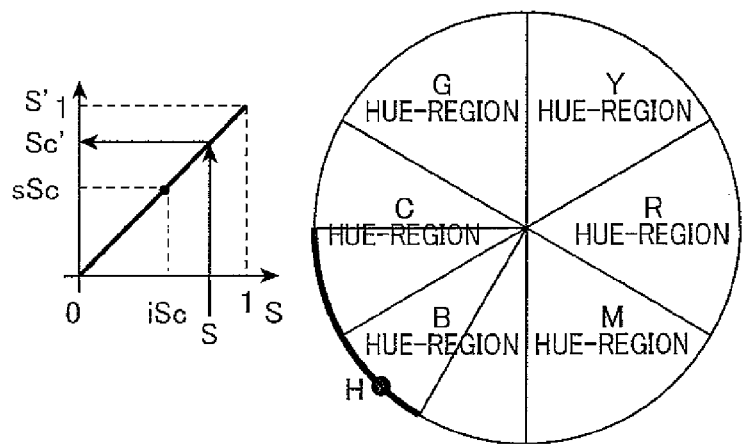
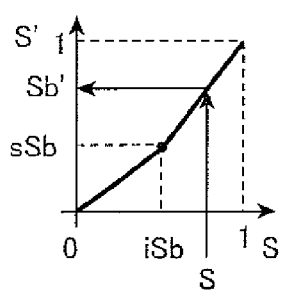

IMAGE PROCESSING DEVICE PERFORMING IMAGE CORRECTION BY USING A PLURALITY OF SAMPLE IMAGES

CROSS REFERENCE TO RELATED APPLICATION

This application claims priority from Japanese Patent Application No. 2007-226480 filed Aug. 31, 2007 and Japanese Patent Application No. 2007-226091 filed Aug. 31, 2007. The entire content of each of these priority applications is incorporated herein by reference.

TECHNICAL FIELD

The present invention relates to an image processing device for performing an image correction process.

BACKGROUND

Image processing devices that correct images based on user preferences are well known in the art. One such image processing device disclosed in Japanese unexamined patent application publication No. 2007-89179 performs image calibration based on calibration data specified by a user selecting a desired type of calibration data from a plurality of types prepared in advance.

SUMMARY

Since specific data must be inputted for calibrating images with the printing device described above, the user must have technical knowledge of the image; in other words, the user cannot perform sensory color adjustments (adjustments made based on the user's instincts or visual impression).

In view of the foregoing, it is an object of the present invention to provide an image processing device and an image processing method that enable a user to perform desired image correction instinctively through simple operations.

In order to attain the above and other objects, the invention provides an image processing device including a first image inputting unit, a comprehensive first characteristic quantity data determining unit, a second image inputting unit, a second characteristic quantity data determining unit, and an image correcting unit. The first image inputting unit is configured so as to be capable of inputting a plurality of first images. The comprehensive first characteristic quantity data determining unit determines comprehensive first characteristic quantity data based on the plurality of first images inputted by the first image inputting unit. The second image inputting unit is configured so as to be capable of inputting a second image. The second characteristic quantity data determining unit determines second characteristic quantity data expressing a characteristic of the second image inputted by the second image inputting unit. The image correcting unit corrects the second image based on the comprehensive first characteristic quantity data and the second characteristic quantity data.

According to another aspect, the present invention provides an image processing method including: inputting a plurality of first images; determining comprehensive first characteristic quantity data based on the plurality of first images; inputting a second image; determining second characteristic quantity data expressing a characteristic of the second image; and correcting the second image based on the comprehensive first characteristic quantity data and the second characteristic quantity data.

According to another aspect, the present invention provides a computer-readable recording medium that stores an image processing program, the image processing program including instructions for: inputting a plurality of first images; determining comprehensive first characteristic quantity data based on the plurality of first images; inputting a second image; determining second characteristic quantity data expressing a characteristic of the second image; and correcting the second image based on the comprehensive first characteristic quantity data and the second characteristic quantity data.

BRIEF DESCRIPTION OF THE DRAWINGS

The particular features and advantages of the invention as well as other objects will become apparent from the following description taken in connection with the accompanying drawings, in which:

FIG. 6 is a flowchart illustrating steps in a first characteristic quantity data determination process;

FIG. 7 is a flowchart illustrating steps in a second characteristic quantity data determination process;

FIG. 19 is an explanatory diagram illustrating changes in a saturation correction curve according to another modification;

FIG. 20 shows graphs for saturation correction tables in the B hue-region and C hue-region.

DETAILED DESCRIPTION

Next, a first embodiment of the present invention will be described while referring to the accompanying drawings.

1. Overall Structure

Figure 1:
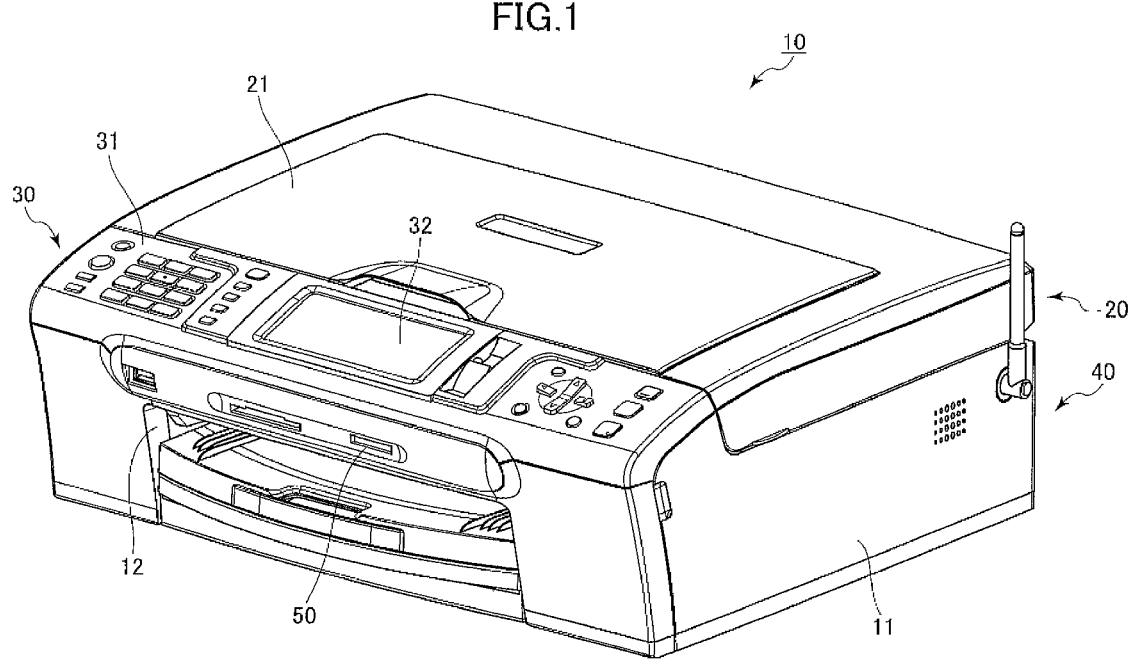
FIG. 1 is a perspective view showing the external appearance of a multifunction device according to a first embodiment of the present invention.

FIG. 1 is a perspective view showing the outer appearance of a multifunction device 10 serving as the image processing device of the first embodiment.

The multifunction device 10 is provided with various functions, including a printer function, scanner function, and color copier function. The multifunction device 10 is configured of a main casing 11, an image-reading unit 20 provided in the upper section of the main casing 11 for scanning documents, a control panel 30 provided on the front of the image-reading unit 20, and an image-printing unit 40 disposed in the bottom section of the main casing 11 for printing color images on a printing medium.

The image-reading unit 20 is a flatbed scanner that optically reads images from a document placed on a document-supporting surface configured of a glass bed. A thin plate-shaped document cover 21 covers the top of the document-supporting surface. By opening the document cover 21 upward, the user can place a document on the document-supporting surface or remove a document therefrom. The surface of the document cover 21 opposing a document positioned on the document-supporting surface is white in color. Therefore, when scanning an image with the document cover 21 closed (the state shown in FIG. 1), areas around the document on the document-supporting surface are scanned as white.

The control panel 30 provided on the front (near side) of the image-reading unit 20 is configured of an operating section 31 including various operating buttons, and a display section 32 (liquid crystal display, for example) for displaying messages, images, and other data.

The image-printing unit 40 provided below the image-reading unit 20 is capable of printing color images on paper or another printing medium. After an image is printed on the paper, the image-printing unit 40 discharges the 10 paper through an opening 12 formed in the front surface of the main casing 11.

The multifunction device 10 also includes a card slot section 50 on the front surface of the main casing 11 above the opening 12. The card slot section 50 accepts the insertion of various memory cards (portable storage media), such as an SD Card or CompactFlash card. The multifunction device 10 also has a direct print function for directly reading from a memory card images taken by a digital still camera or the like, rather than reading images from a personal computer or other data processor, and for printing these images.

Figure 2:
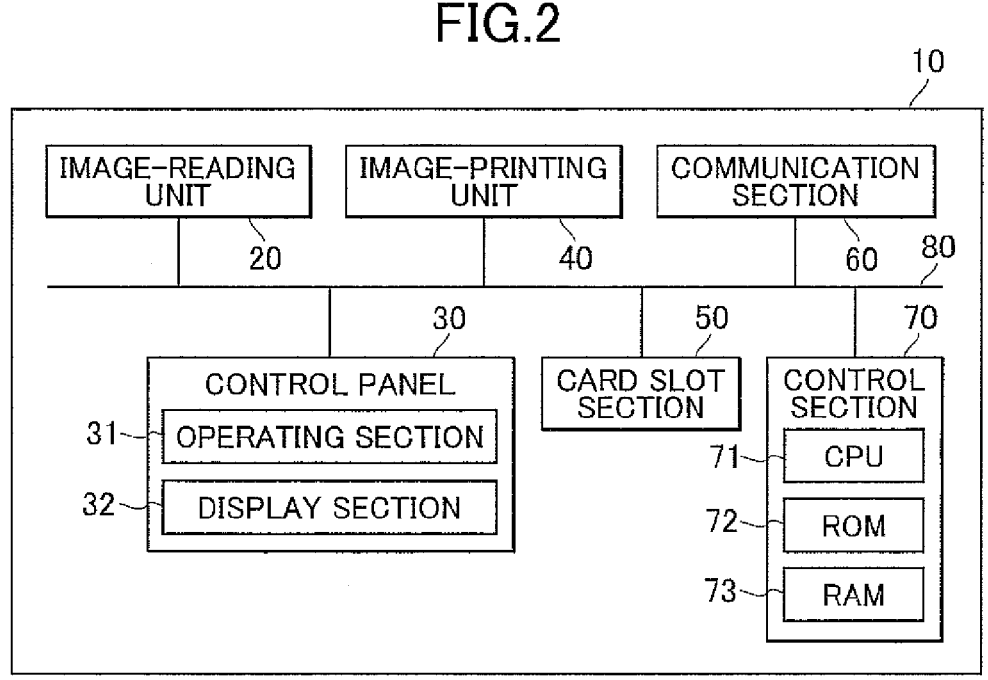
FIG. 2 is a block diagram illustrating the general structure of a control system in the multifunction device.

Next, the control system of the multifunction device 10 will be described. FIG. 2 is a block diagram showing the overall structure of this control system. As shown in FIG. 2, the multifunction device 10 includes the image-reading unit 20, control panel 30, image-printing unit 40, and card slot section 50 described above, as well as a communication section 60 and a control section 70 connected to one another via a signal line 80.

When connected to a communication cable, such as a LAN cable, the communication section 60 transmits and receives data via the communication cable. Hence, the communication section 60 functions to perform data communications with an external device such as a personal computer connected to the LAN or a Web server on the Internet.

The control section 70 is primarily configured of a microcomputer having a CPU 71, a ROM 72, and a RAM 73, and performs overall control of the components constituting the multifunction device 10. The ROM 72 stores programs executed by the CPU 71 to implement a color conversion process described later.

2. Overview of the Color Conversion Process

Figure 3:
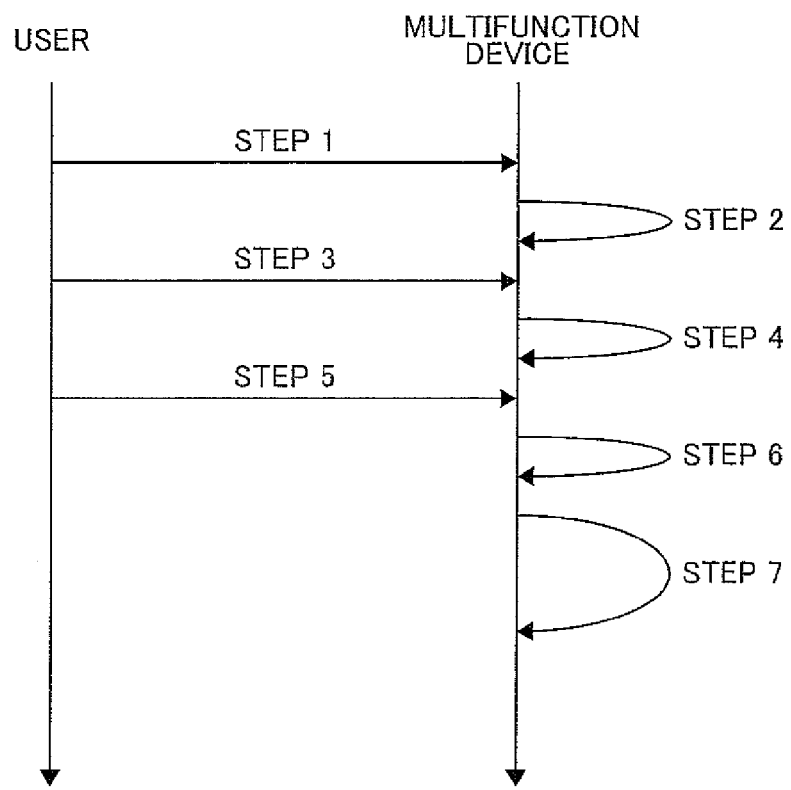
FIG. 3 is an explanatory diagram showing an overview of user operations and resulting processing on the multifunction device in a color conversion process.

Next, an overview of the color conversion process performed on the multifunction device 10 will be described. The multifunction device 10 performs color conversion on a user's selected image based on an image serving as a model for color conversion (hereinafter referred to as a "sample image"). First, the basic steps in this color conversion process will be described with reference to FIG. 3.

First, the user places a document on which a sample image is printed, such as a photograph, on the document-supporting surface of the image-reading unit 20 and operate the operating section 31 to input his/her instruction to scan the document (step 1). At this time, the multifunction device 10 reads the sample image within a specified region of the document-supporting surface (a user-specified size, such as L-size (photo paper), A4 size, or the like) (step 2). Through these processes, sample image is read from the document resting on the document-supporting surface.

Next, the user inserts a memory card storing images as candidates for color conversion into the card slot section 50 (step 3). The multifunction device 10 recognizes the inserted memory card and prompts the user to select an image to be subjected to color conversion from among the images stored on the memory card (step 4). Here, any suitable process known in the art may be employed as the process for prompting the user to select an image, such as a process for displaying images stored in the memory card on the display section 32 and enabling the user to select an image through operations on the operating section 31.

Once the user has selected an image to be subjected to color conversion (step 5), the multifunction device 10 reads the selected image (step 6). In the following description, the selected image will be referred to as the "original image."

Subsequently, the multifunction device 10 performs a process to correct the original image read from the memory card using the sample image read from the image-reading unit 20 as a model (step 7). In this procedure, the original image is read from the memory card after reading the sample images from the image-reading unit 20, but the present invention is not limited to this order. It is also possible to read the original image from the memory card first and subsequently read the sample image with the image-reading unit 20.

Through this color conversion process, the user can execute a color conversion process on an original image that is intuitively based on a sample image and requires only simple operations to perform.

In order to accomplish more desirable color conversion, the multifunction device 10 according to the embodiment can perform a color conversion process using a plurality of sample images, rather than using only a single sample image.

3. Detailed Description of the Color Conversion Process

Next, a detailed description of the color conversion process executed on the multifunction device 10 of the embodiment will be described.

3-1. Color Conversion Process

Figure 4:
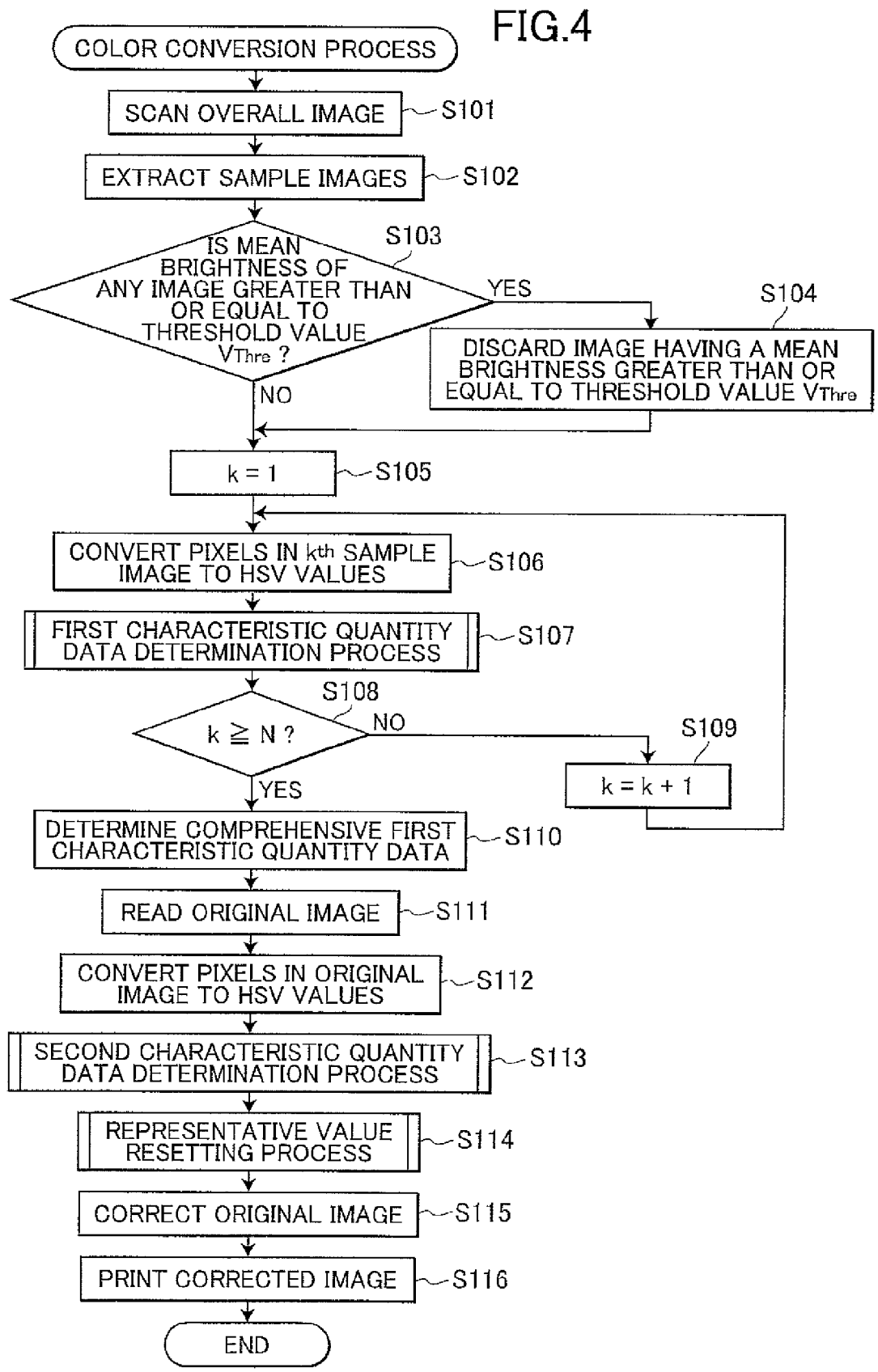
FIG. 4 is a flowchart illustrating steps in the color conversion process.

FIG. 4 is a flowchart illustrating steps in the color conversion process executed by the CPU 71 of the multifunction device 10. In S101 at the beginning of this color conversion process, the CPU 71 scans the entire region of the document-supporting surface in the image-reading unit 20 as an overall image. In the embodiment, the format for the scanned image data is the RGB format, but the present invention is not limited to this format.

Figure 5A:
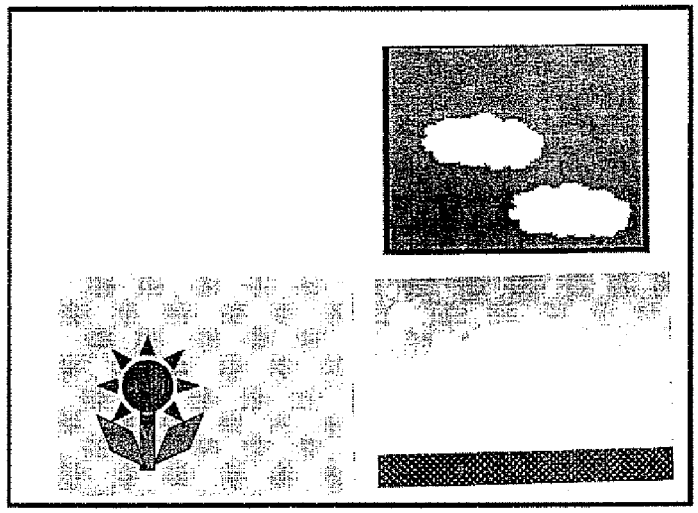
FIG. 5A is an explanatory diagram showing a document-supporting surface of the multifunction device when a plurality of documents are placed on the document-supporting surface.
Figure 5B:
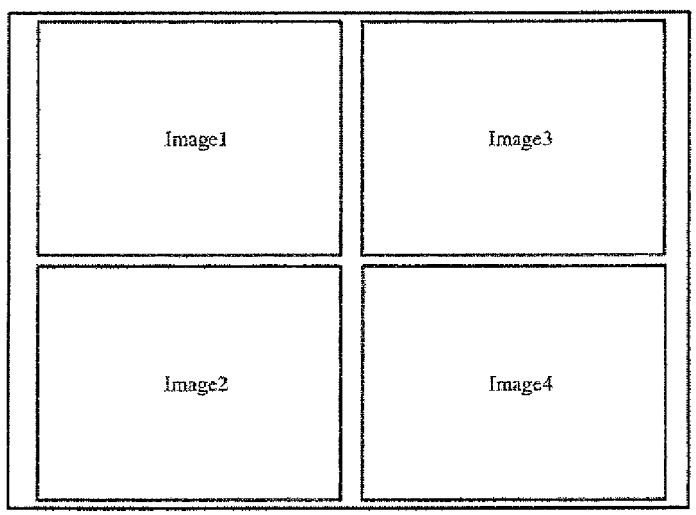
FIG. 5B is an explanatory diagram showing scanning regions in document-supporting surface.
Figure 5C:
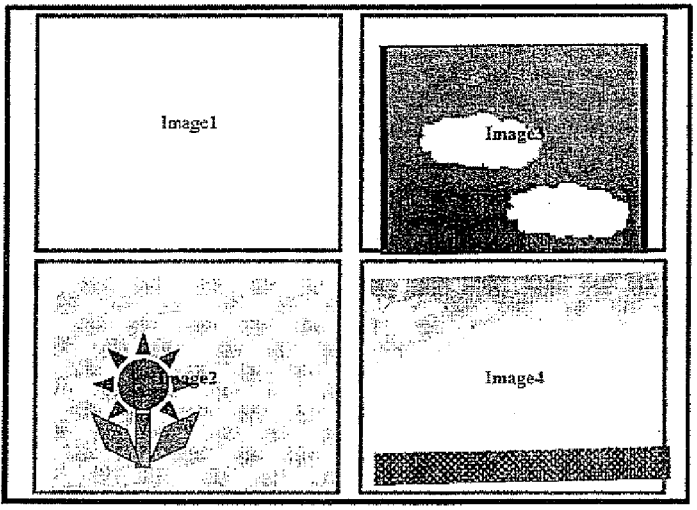
FIG. 5C is an explanatory diagram showing a plurality of recognized sample images.

In S102 the CPU 71 extracts sample images from the overall image scanned in S101. In the embodiment, the document-supporting surface has been divided into a plurality of scanning regions, and the CPU 71 can recognize independent sample images scanned within the individual scanning regions of the document-supporting surface. For example, the document-supporting surface can be divided in half both vertically and horizontally to produce a total of four scanning regions, as shown in FIG. 5B. In this case, if a plurality (three in the example of FIG. 5A) of photographs is placed on the document-supporting surface, the CPU 71 recognizes the image of each photograph as an individual image as illustrated in FIG. 5C. At this time, a scanning region without a photograph (Image1 in the example of FIG. 5C) is still recognized as an image (a white image since the inside of the document cover 21 is white). The number of scanning regions described above may be preset as a default or specified by the user.

In S103 the CPU 71 determines whether a mean brightness $V_{mean}$ of each sample image determined in S102 is greater than or equal to a predetermined threshold value $v_{Thre}$ (0.97, for example). The mean brightness $V_{mean}$ is an average value of brightness values of all the pixel(s) in each sample image. The CPU 71 performs a process to convert each pixel constituting the each sample image to a set of HSV parameters, where H is a value from 0 to 360 and S and V are values between 0 and 1. The brightness value "V" is calculated by the following formula:

$$V = \max(R \div 255, G \div 255, B \div 255),$$

wherein max(a, b, c) denotes the largest value among a, b, and c.

Here, the threshold value $V_{Thre}$ is set as a reference value for determining whether a document has been placed on the document-supporting surface of the image-reading unit 20. When mean brightness $V_{mean}$ of some sample image is at least the threshold value $V_{Thre}$ (i.e., when it is determined that the image is white only), there is a high probability that no document has been placed on the document-supporting surface at the corresponding scanning region.

If the CPU 71 determines in S103 that there exists a sample image having a mean brightness $V_{mean}$ greater than or equal to the threshold value $v_{Thre}$ (S103: YES), in S104 the CPU 71 discards the sample image and advances to S105. In the example of FIGS. 5A-5C described above, the CPU 71 would remove the white image scanned as Image1 from among the four scanning regions.

However, if the CPU 71 determines in S103 that there exists no sample image having a mean brightness $V_{mean}$ greater than or equal to the threshold value $V_{Thre}$ (S103: NO), in S105 the CPU 71 initializes a counter k to 1.

In S106 the CPU 71 performs a process to convert each pixel constituting the $k^{th}$ sample image among N sample images (where N is a natural number) determined in S101-S104 to a set of HSV parameters, where H is a value from 0 to 360 and S and V are values between 0 and 1.

Method of RGB→HSV Conversion

First, the value "V" is calculated by the following formula:

$$V = \max(R \div 255, G \div 255, B \div 255),$$

wherein max(a, b, c) denotes the largest value among a, b, and c.

Based on the determined value "V", the value "S" is calculated by the following formulas;

when v is 0, S=0; and when V is not 0, $S = \{V - \min(R \div 255, G \div 255, B \div 255)\} \div V,$ wherein min(a, b, c) denotes the smallest value among a, b, and c.

Based on the value "V", the value "r", "g", and "b" are determined by the following formulas:

when $\{V - \min(R \div 255, G \div 255, B \div 255)\}$ is not 0, $$r = (V - R \div 255) \div (V - \min(R \div 255, G \div 255, B \div 255)),$$

$$g = (V - G \div 255) \div (V - \min(R \div 255, G \div 255, B \div 255)),$$

$$b = (V - B \div 255) \div (V - \min(R \div 255, G \div 255, B \div 255)); \text{ and}$$

when $\{V - \min(R \div 255, G \div 255, B \div 255)\}$ is 0, $$r = 0,$$

$$g = 0,$$

$$b = 0.$$

Based on the values "r", "g", and "b", the value "H" is calculated by the following formulas:

when $V = R \div 255, H = 60 \times (b - g);$ when $V = G \div 255, H = 60 \times (2 + r - g);$ and when $v = B \div 255, H = 60 \times (4 + g - r).$ It is noted that when H<0, H=H+360

In S107 the CPU 71 performs a first characteristic quantity data determination process for determining a set of first characteristic quantity data representing a characteristic of the $k^{th}$ sample image based on the HSV parameters obtained in the conversion process of S106. The first characteristic quantity data determination process will be described later in greater detail with reference to FIG. 6.

In S108 the CPU 71 determines whether the counter k has reached n, wherein N is the total number of the sample images. In other words, the CPU 71 determines whether the process in S106 and S107 has been performed for 15 all sample images. If the counter k has not reached N (S108: no), in S109 the CPU 71 increments the counter k by 1 and returns to S106.

However, if the counter k has reached N (S108: YES), in S110 the CPU 71 determines a set of comprehensive first characteristic quantity data representing the overall characteristics of N sample images based on the first characteristic quantity data determined, for all the sample images. The method of determining this quantity data is described in detail later.

In S111 the CPU 71 loads the image to be subjected to color conversion (original image) from the memory card into the RAM 73. In the embodiment, the original image will be described as having an RGB format, but the present invention is not particularly limited to this format.

In S112 the CPU 71 performs a process to convert each pixel in the original image read in S111 to a set of HSV parameters. In S113 the CPU 71 performs a second characteristic quantity data determination process for determining a set of second characteristic quantity data denoting a characteristic of the original image based on the HSV parameters obtained in the conversion process of S112. The second characteristic quantity data determination process will be described later in greater detail with reference to FIG. 7.

In S114 the CPU 71 performs a representative value resetting process for resetting the values of the comprehensive first characteristic quantity data and the values of the second characteristic quantity data for those hue-regions that should not be subjected to color conversion (color correction) of S115 to be described below. This representative value resetting process will be described later in greater detail with reference to FIG. 9.

In S115 the CPU 71 corrects the original image based on the comprehensive first characteristic quantity data and the second characteristic quantity data. Details of this correction method will be described later. In S116 the CPU 71 controls the image-printing unit 40 to print the original image corrected in S115, and subsequently ends the color conversion process.

3-2. First Characteristic Quantity Data Determination Process for the Sample Image Next, the first characteristic quantity data determination process for the $k^{th}$ sample image performed in S107 of FIG. 4 will be described with reference to FIG. 6. FIG. 6 is a flowchart illustrating steps in the first characteristic quantity data determination process. In the following process, it will be assumed that H takes on a value of at least −30 and less than 330. When H does not fall within this range, H is adjusted to a value within the range according to a suitable conversion, such as H=H+360×n or H=H−360×n, where n is an integer.

In S201 of the first characteristic quantity data determination process, the CPU 71 divides the sample image into a plurality of hue-regions (six commonly used hue regions in this example). Specifically, each of the pixels in the sample image is allocated into either one of the following six hue-regions based on its H value:
R hue-region: grater than or equal to −30 and less than 30
Y hue-region: grater than or equal to 30 and less than 90
G hue-region: grater than or equal to 90 and less than 150
C hue-region: grater than or equal to 150 and less than 210
B hue-region: grater than or equal to 210 and less than 270
M hue-region: grater than or equal to 270 and less than 330

Hence, the CPU 71 performs a process to sort all the pixels of the original image into six classifications based on the above classification criteria for the hue value. The correspondence between each hue-region and the H value given above is merely an example and may be modified as appropriate.

In S202 the CPU 71 calculates representative values (HSV values) for each hue-region in which pixels have been sorted in S201 and the percentage of the sample image that each hue-region occupies.

The representative values (HSV values) for each hue-region are defined as follows.
Representative values for the R hue-region: sHr#k, sSr#k, sVr#k
Representative values for the G hue-region: sHg#k, sSg#k, sVg#k
Representative values for the B hue-region: sHb#k, sSb#k, sVb#k
Representative values for the C hue-region: sHc#k, sSc#k, sVc#k
Representative values for the m hue-region: sHm#k, sSm#k, sVm#k
Representative values for the Y hue-region: sHy#k, sSy#k, sVy#k Here, the representative values in each hue-region are average values of the HSV values of all the pixels allocated in the subject hue-region. The representative values for each hue-region may be median values or middle values of the HSV values of all the pixels in the subject hue-region, instead of the average values.

The percentage that each hue-region occupies in the k-th sample image is defined as follows:
Percentage that the R hue-region occupies in the k-th sample image: sRateR#k
Percentage that the G hue-region occupies in the k-th sample image: sRateG#k
Percentage that the B hue-region occupies in the k-th sample image: sRateB#k
Percentage that the C hue-region occupies in the k-th sample image; sRateC#k
Percentage that the M hue-region occupies in the k-th sample image: sRateM#k
Percentage that the Y hue-region occupies in the k-th sample image: sRateY#k The percentage for the R hue-region, for example, may be defined as sRateR#k=(number of pixels in the R hue-region of the sample image)÷(total number of pixels in the sample image), or may be defined according to another equation.

3-3. Process for Determining the Comprehensive First Characteristic Quantity Data Next, a method of determining the comprehensive first characteristic quantity data (first characteristic quantity data accounting for the characteristics of all sample images) will be described. This process is performed in S110 of the color conversion process described above with reference to FIG. 4 for determining the comprehensive first characteristic quantity data based on first characteristic quantity data determined for all of N sample images.

It is noted that the comprehensive first characteristic quantity data determined in S110 includes the following data:
Comprehensive representative values for the R hue-region: sHr, sSr, sVr
Comprehensive representative values for the G hue-region: sHg, sSg, sVg
Comprehensive representative values for the B hue-region: sHb, sSb, sVb
Comprehensive representative values for the C hue-region: sHc, sSc, sVc
Comprehensive representative values for the M hue-region: sHm, sSm, sVm
Comprehensive representative values for the Y hue-region: sHy, sSy, sVy
Comprehensive percentage for the R hue-region: sRateR
Comprehensive percentage for the G hue-region: sRateG
Comprehensive percentage for the B hue-region: sRateB
Comprehensive percentage for the C hue-region: sRateC
Comprehensive percentage for the M hue-region: sRateM
Comprehensive percentage for the Y hue-region: sRateY In S110, one sample image is selected, for each hue-region, among the N sample images based on the N sets of first characteristic quantity data for the N sample images. For each hue-region, the first characteristic quantity data for the selected sample image for the subject hue-region is set as the comprehensive first characteristic quantity data for the subject hue-region.

For example, the first comprehensive characteristic quantity data sHr, sSr, sVr, and sRateR for the R hue-region are determined in a manner described below.

First, the CPU 71 selects the largest percentage value sRateR#k (where k is an integer greater than or equal to 1 and smaller than or equal to N) from among all the N number of percentage values sRateR#1 through sRateR#N determined for the N sample images. Thus, the CPU 71 selects one (k-th) sample image that is occupied by the R hue-region to the largest degree among all the N sample images. Then, the CPU 71 sets the representative values sHr#k, sSr#k, and sVr#k for the selected k-th sample image as the representative values sRr, sSr, and sVr for the R hue-region in the comprehensive first characteristic quantity data. The CPU 71 sets the percentage sRateR#k that the R hue-region occupies in the selected k-th sample image as the value sRateR for the R hue-region in the comprehensive first characteristic quantity data.

The comprehensive first characteristic quantity data is determined by performing this process for the other five hue-regions.

3-4. Second Characteristic Quantity Data Determination Process

Next, the second characteristic data determination process of S113 in FIG. 4 for extracting the second characteristic quantity data from the original image will be described with reference to FIG. 7. FIG. 7 is a flowchart illustrating steps in the second characteristic quantity data determination process. Similarly to the pixels in the sample image, all the pixels in the original image are sorted in the six hue-regions R, G, B, C, m and Y in a manner the same as S107. Specifically, in S301 the CPU 71 divides the original image into six hue-regions. In S302 the CPU 71 calculates the second characteristic quantity data for the original image. The second characteristic quantity data includes the following data:

Representative values for the R hue-region: iHr, iSr, iVr
Representative values for the G hue-region: iHg, iSg, iVg
Representative values for the B hue-region: iHb, iSb, iVb
Representative values for the C hue-region: iHc, iSc, iVc
Representative values for the m hue-region: iHm, iSm, iVm
Representative values for the Y hue-region: iHy, iSy, iVy
Percentage that the R hue-region occupies in the original image: iRateR
Percentage that the G hue-region occupies in the original image: iRateG
Percentage that the B hue-region occupies in the original image: iRateB
Percentage that the C hue-region occupies in the original image: iRateC
Percentage that the M hue-region occupies in the original image: iRateM
Percentage that the Y hue-region occupies in the original image: iRateY During the representative value resetting process in S114, the CPU 71 determines whether each hue-region should be subjected to the color correction of S115. In other words, the CPU 71 determines whether each hue-region should be a target of conversion of S115. If the CPU 71 determines that the hue-region in question should not be a target of conversion, the CPU 71 resets the representative values both in the comprehensive first characteristic quantity data and in the second characteristic quantity data for the subject hue-region.

Next, the process performed in S115 of FIG. 4 to convert the original image based on the comprehensive first characteristic quantity data and second characteristic quantity data will be described in detail. In this process, the multifunction device 10 converts the h value, S value, and V value of each pixel in the original image.

Figure 8:
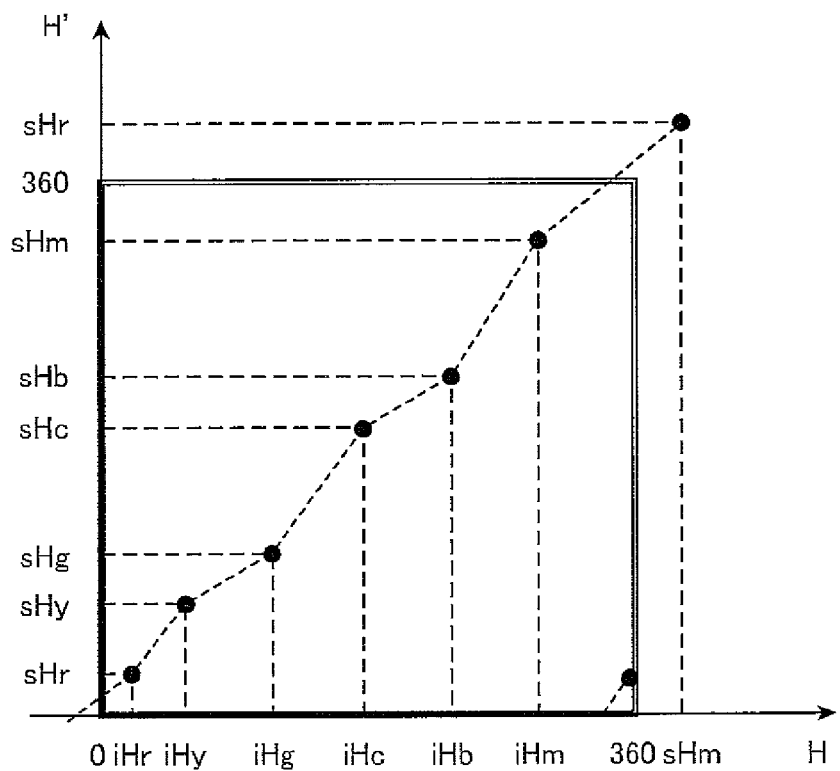
FIG. 8 is a graph for a hue correction table.

First, the conversion process for the H values of each pixel in the original image will be described. Representative H values for all the hue-regions are plotted in a graph, as shown in FIG. 8, with the X-axis denoting the representative H values of the second characteristic quantity data and the Y-axis denoting the representative H values (denoted by H') of the comprehensive first characteristic quantity data. Subsequently, a hue conversion table based on the graph in FIG. 8 is created as indicated by a broken line using linear interpolation, for example, between the plotted points.

The H value of each pixel in the original image is corrected into a corrected H' value by applying the hue conversion table to the H value in each pixel. More specifically, the corrected H' value can be defined according to the following equation:

$$H' = (y2-y1) \div (x2-x1) \times H(y2-y1) \div (x2-x1) \times x2 + y2 \qquad \text{(Equation 1)}$$

Here, H' is set to H'−360 when H'>360.
Here, x1, x2, y1, and y2 are defined as follows.
When H<iHr, $$(x1, y1) = (iHm-360, sHm-360), \text{ and}$$

$$(x2, y2) = (iHr, sHr).$$

When iHr≦H<iHy, $$(x1, y1) = (iHr, sHr), \text{ and}$$

$$(x2, y2) = (iHy, sHy).$$

When iHy≦H<iHg, $$(x1, y1) = (iHy, sHy), \text{ and}$$

$$(x2, y2) = (iHg, sHg).$$

When iHg≦H<iHc, $$(x1, y1) = (iHg, sHg), \text{ and}$$

$$(x2, y2) = (iHc, sHc).$$

When iHc≦H<iHb, $$(x1, y1) = (iHc, sHc), \text{ and}$$

$$(x2, y2) = (iHb, sHb).$$

When iHb<H<iHm, $$(x1, y1) = (iHb, sHb), \text{ and}$$

$$(x2, y2) = (iHm, sHm).$$

When iHm≦H, $$(x1, y1) = (iHm; sHm), \text{ and}$$

$$(x2, y2) = (iHr+360, sHr+360).$$

Next, conversion of the S value and V value in each pixel will be described. The S and V values of each pixel in the original image are converted in a manner that is determined dependent on the hue-region in which the hue value H of the subject pixel is allocated. For example, values "S" and "V" for a pixel, whose H value is allocated in the R hue-region, are converted into corrected values "S'" and "V'" by the following equations:
When S≦iSr, $$S' = S \times (sSr \div iSr) \qquad \text{(Equation 2).}$$

When S>iSr, $$S' = 1 + (S-1) \times \{(1-sSr) \div (1-iSr)\} \qquad \text{(Equation 3).}$$

When V≦iVr, $$V' = V \times (sVr \div iVr) \qquad \text{(Equation 4).}$$

When V>iVr, $$V' = 1 + (V-1) \times \{(1-sVr) \div (1-iVr)\} \qquad \text{(Equation 5).}$$

S and V values for pixels, whose H values are allocated in other hue-regions, can be similarly calculated. Below, a conversion table defined by the above-described conversion method for S values is referred to as a saturation conversion table, while a conversion table defined by the above-described conversion method for the V value is referred to as a brightness conversion table.

Next, the HSV values of each pixel that has been converted as described above is converted to a format (RGB values, for example) suitable for the image printing section 40. The following method of conversion is merely an example, and it should be apparent that conversion may be performed according to another method.

Method of HSV→RGB Conversion

Below, in, fl, mr and n are parameters used in the process of calculating RGB values from HSV values. Here, in will be the integer portion of (H'÷60) and fl the decimal portion of (H'÷60).

$fl=1-fl$ $m=V' \times (1-S')$ $n=V' \times (1-S' \times fl)$

When in is 0, $R=V' \times 255$, $G=n \times 255$, and $B=m \times 255$.

When in is 1, $R=n \times 255$, $G=V' \times 255$, and $B=m \times 255$.

When in is 2, $R=m \times 255$, $G=V' \times 255$, and $B=n \times 255$.

When in is 3, $R=m \times 255$, $G=n \times 255$, and $B=V' \times 255$.

When in is 4, $R=n \times 255$, $G=m \times 255$, and $B=V' \times 255$.

When in is 5, $r=V' \times 255$, $G=m \times 255$, and $B=n \times 255$.

The color tone in the original image can be converted to the color tone of the sample image by performing the conversion process on the original image to bring the second characteristic quantity data close to the comprehensive first characteristic quantity data in each hue-region. In other words, the multifunction device 10 corrects the original image based on the comprehensive first characteristic quantity data and the second characteristic quantity data to change the characteristic (color tone) of original image closer to a characteristic (color tone) defined by the comprehensive first characteristic quantity data.

Figure 9:
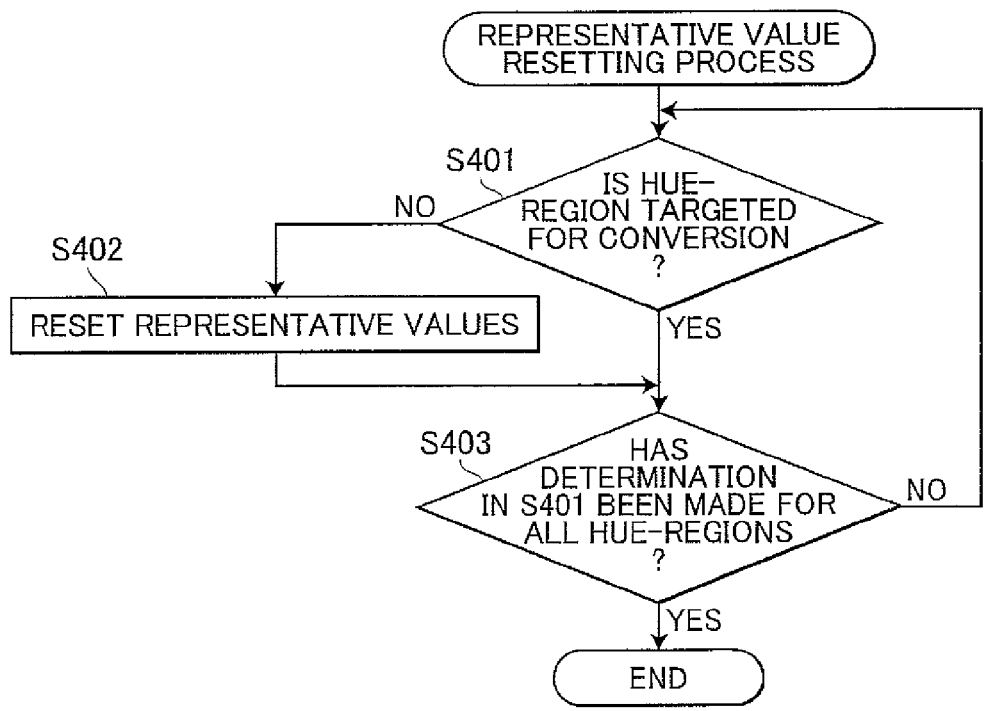
FIG. 9 is a flowchart illustrating steps in a representative value resetting process.

FIG. 9 is a flowchart illustrating steps in the representative value resetting process of S114 in FIG. 4.

In S401 of this process, the CPU 71 determines whether one hue-region among the six hue-regions should be a target of conversion. The CPU 71 performs this determination by determining whether the subject hue-region meets a prescribed condition.

The CPU 71 advances to S402 when determining that the hue-region is not a target of conversion (S401: NO) and advances to S403 when determining that the hue-region is a target of conversion (S401: YES). In S402 the CPU 71 resets the representative values for the hue-regions and subsequently advances to S403. More specifically, for the hue-region that is not a target of conversion, the CPU 71 resets the hue representative values in the comprehensive first characteristic quantity data and in the second characteristic quantity data to be equal to each other, resets the saturation representative values in the comprehensive first characteristic quantity data and in the second characteristic quantity data to be equal to each other, and resets the brightness representative values in the comprehensive first characteristic quantity data and in the second characteristic quantity data to be equal to each other. For example, the CPU 71 resets the hue representative values to the middle value of the subject hue region, resets the saturation representative values to the middle value (0.5) in the range of saturation (0 to 1), and resets the brightness representative values to the middle value (0.5) in the range of brightness (0 to 1).

In S403 the CPU 71 determines whether the process in S401 for determining whether a hue-region is to be converted has been performed for all hue-regions (six hue-regions in the example). If there remain any hue-regions for which the determination of S401 has not yet been performed (S403: NO), the CPU 71 returns to S401. When a determination has been performed on all hue-regions (S403: YES), the CPU 71 ends the representative value resetting process. Examples of the method of the judgment in S401 includes: (A) a method of using a threshold thre; and (B) a method of using data of a hue-region, having the largest area.

(A) Method Using a Threshold Thre

The prescribed condition used in the judgment of S401 described above is a relationship between the size of the hue-region and a threshold Thre. When, for some hue-region, the comprehensive percentage in the comprehensive first characteristic quantity data or the percentage in the second characteristic quantity data is less than the threshold Thre (yes in S401), the CPU 71 changes in S402 the representative values in the comprehensive first characteristic quantity data of the sample images and the representative values in the second characteristic quantity data of the original image related to this hue-region to the same values, so that conversion will be executed by using the new representative values. The representative values can be changed or reset in the following way:

When sRateR<Thre or iRateR<Thre,
sHr=0, sSr=0.5, sVr=0.5,
iHr=0, iSr=0.5, iVr=0.5.
When sRateG<Thre or iRateG<Thre,
sHg=120, sSg=0.5, sVg=0.5,
iHg=120, iSg=0.5, iVg=0.5.
When sRateB<Thre or iRateB<Thre,
sHb=240, sSb=0.5, sVb=0.5,
iHb=240, iSb=0.5, iVb=0.5.
When sRateC<Thre or iRateC<Thre,
sHc=180, sSc=0.5, sVc=0.5,
iHc=180, iSc=0.5, iVc=0.5.
When sRateM<Thre or iRateM<Thre,
sHm=300, sSm=0.5, sVm=0.5,
iHm=300, iSm=0.5, iVm=0.5.

When sRateY<Thre or iRateY<Thre,
sHy=60, sSy=0.5, sVy=0.5,
iHy=60, iSy=0.5, iVy=0.5.

The above example employs the middle value 0.5 of possible values (0-1) for the S value and V value, and also employs the middle value of the corresponding hue-region for the H value. However, the representative values described above are merely an example, and the present invention is not limited to these values.

When converting a pixel using the equations described above (Equations 2-5), the S and V values of the pixel do not change using the representative values described above. For example, when S≦iSr for the R hue-region, S' is calculated according to equation 2 as follows.

$$S'=S\times(sSr \div iSr)$$

However, since sSr=0.5 and iSr=0.5 in this equation, the equation becomes:

$$S'=S\times(0.5 \div 0.5)=S \quad \text{(Equation 6)}$$

Similarly, S'=S when S>iSr.

The V values in this hue-region are not changed, either. The S and V values in other hue-regions are also not changed in the same manner as described above for R hue-region.

Further, by resetting the representative H values for some hue-region in a manner described above, it is possible to reduce the amount of conversion in the hue-region. In other words, the amount of conversion can be reduced by modifying the representative H values, even when using the conversion equation described above (Equation 1).

Next, a method of determining the threshold Thre will be described. This value can be set based on a sensory evaluation (visual impression). In sensory evaluations, the inventors have confirmed that any hue-region is likely to be perceived when the hue-region occupies more than about 6% of the entire image area. Hence, the threshold Thre can be set to 6%. However, the present invention is not limited to a threshold Thre of 6%.

It is also possible to set the threshold Thre to such a value that can extract hue-regions having a large area relative to other hue-regions. For example, because the image is divided into six hue-regions, the threshold Thre can be set to the inverse value, or ⅙ of the total number of the hue regions.

The number "six" given as an example of the number of hue-regions is identical to a number that is obtained by subtracting the number of the achromatic colors white and black from the number of vertices (eight that is possessed by an RGB color space, which is one of color gamuts expressing colors). The human eyes can differentiate colors sufficiently when the hues are divided into six hue-regions. If the number of the hue regions is set less than six, there is a possibility that the user may not feel that the original image is modified based on the sample image. Dividing the image into more than six hue-regions will increase the conversion accuracy. However, it is likely that the user will not be able to distinguish the differences in color. Further, the number of calculations increases when the number of divisions increases. When using a printer, such an increase in computations increases the time required to obtain the calibrated image as the printing results, potentially leading to more frustration for the user. Therefore, it is thought that six is a preferable number of divisions.

While the same threshold is used for all hue-regions in the above example, a different threshold Thre may be used for each hue-region.

(B) Method Using Data of a Hue-Region Having the Largest Percentage

In the above method (A), a threshold Thre is set and representative values are modified based on this threshold Thre, thereby performing control to suspend the image correction process in some hue-regions and to reduce the amount of conversions. Contrarily, the method (B) enables the image correction process to use data of a hue-region having the largest area in the image in order to incorporate only specific colors of the sample image in the original image.

In this method, the prescribed condition in the determination of S401 in FIG. 9 is whether a hue-region having the largest percentage in the second characteristic quantity data is the same as a hue region having the largest comprehensive percentage in the comprehensive first characteristic quantity data, and the hue-region in question is the hue-region having the largest percentage value both in the second characteristic quantity data and in the comprehensive first characteristic quantity data. If the judgment is S401 is affirmative, the representative values for hue-regions other than the subject hue-region are reset according to the following equations, where iMaxRate is the percentage having the largest value in the second characteristic data, and sMaxRate is the comprehensive percentage having the largest value in the comprehensive percentages.

When sRateR≠sMaxRate or IRateR≠iMaxRate,
sHr=0, sSr=0.5, sV=0.5,
iHr=0, iSr=0.5, iVr=0.5.
When sRateG≠sMaxRate or iRateG≠iMaxRate,
sHg=120, sSg=0.5, sVg=0.5,
iHg=120, iSg=0.5, iVg=0.5.
When sRateB≠sMaxRate or iRateB≠iMaxRate,
sHb=240, sSb=0.5, sVb=0.5,
iHb=240, iSb=0.5, iVb=0.5.
When sRateC≠sMaxRate or iRateC≠iMaxRate,
sHc=180, sSc=0.5, sVc=0.5,
iHc=180, iSc=0.5, iVc=0.5.
When sRateM≠sMaxRate or iRateM≠iMaxRate,
sHm=300, sSm=0.5, sVm=0.5,
iHm=300, iSm=0.5, iVm=0.5.
When sRateY≠sMaxRate or iRateY≠iMaxRate,
sHy=60, sSy=0.5, sVy=0.5,
iHy=60, iSy=0.5, iVy=0.5.

Through this process, only those pixels that are located in the hue-region that has the largest percentage value both in the second characteristic quantity data and in the comprehensive first characteristic quantity data are converted. Accordingly, in the hue-regions other than the largest-area hue-region, S and V values are not converted, and the amount of conversions for H values is reduced.

Figure 10:
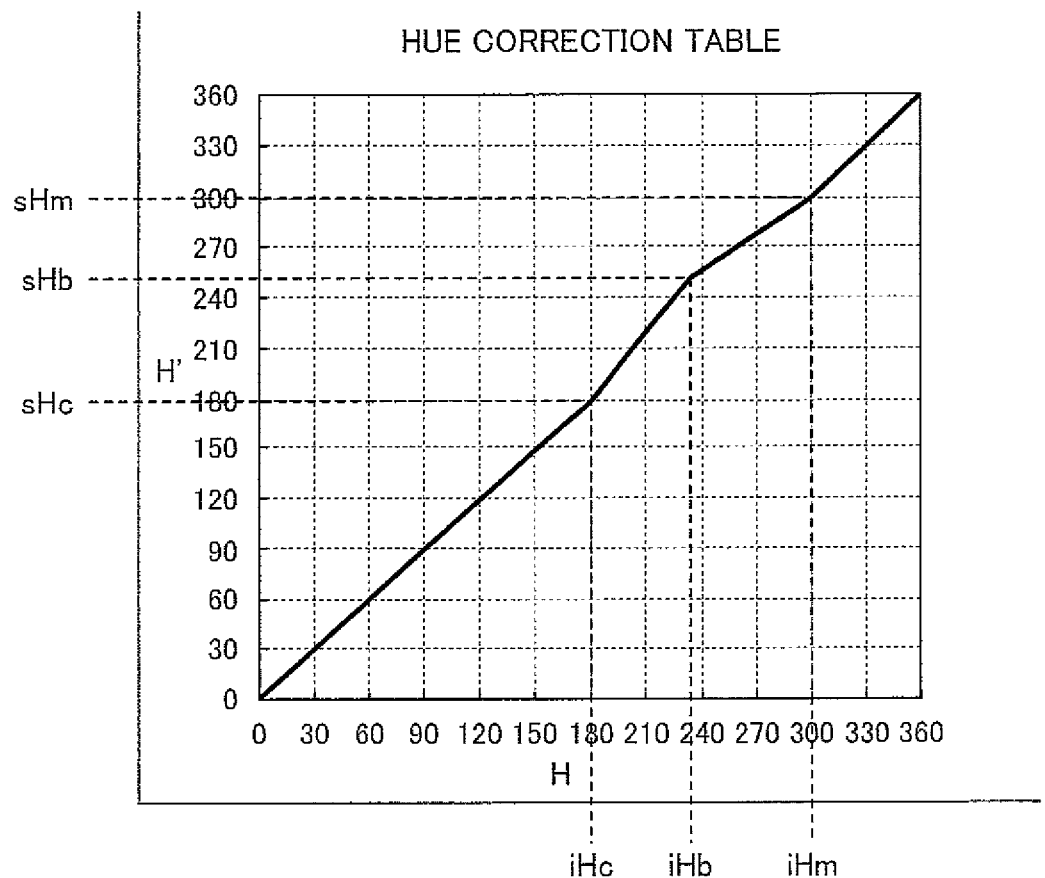
FIG. 10 is a graph for a hue correction table created when only the B hue-region is converted.

For example, when the percentage for B hue-region has the largest value both in the comprehensive first characteristic quantity data and the second characteristic quantity data, the hue correction table is created as shown in FIG. 10. As shown in the graph of FIG. 10, the representative H values (iHc=180, sHc=180) in the C hue-region adjacent to the B hue-region in the color space and the representative H values (iHb, sHb) in the B hue-region are connected with each other by a straight line, and the representative H values (iHm=300, sHm=300) in the M hue-region adjacent to the B hue-region in the color space and the representative H values (iHb, sHb) in the B hue-region are connected with each other by another straight line.

Therefore, H values are converted in both the C hue-region, where 180<H≦210, and the M hue-region, where 270<H≦300. The amount of conversion increases in values closer to the B hue-region.

In the representative value resetting process described above, it is possible to select hue-regions where conversion is executed. Further, since a portion of the H values in hue-regions not targeted for conversion but adjacent to hue-regions targeted for conversion in the color space are converted, this method can prevent the occurrence of false contour (tone jump) between converted and non-converted hue-regions.

By executing the representative value resetting process, the image processing device according the embodiment is capable of suspending part of the image correction process or controlling the amount of the image correction for each hue-region based on the size thereof. In this way, the user can control the process to reflect only some color tone of the sample image in the color tones of the original image.

As described above, the multifunction device acquires a plurality of sample images from the image-reading unit 20 (S101-S104), sorts the pixels constituting each of the sample images into six hue-regions based on their hue values, and determines representative values to the average values of all the HSV values for each hue-region (S105-S109). Next, the multifunction device 10 sets representative values, which are selected for each hue-region from among the determined representative values, as comprehensive first characteristic quantity data indicating the overall characteristics of the plurality of sample images (S110). More specifically, the multifunction device calculates the percentage of the sample image occupied by the pixels belonging to each hue-region for each of the plurality of sample images. Next, the multifunction device 10 selects, for each hue-region, one sample image that has the subject hue-region at the largest percentage among all the sample images. The multifunction device 10 then sets, for each hue-region, the first characteristic quantity data for the selected sample image for the subject hue-region as the comprehensive first characteristic quantity data for the subject hue-region.

The multifunction device 10 also inputs the original image targeted for color conversion from the memory card (S111), sorts pixels constituting the inputted original image into six hue-regions based on the hue values, and determines the mean HSV values among pixels belonging to each hue-region as the second characteristic quantity data representing the characteristics of the original image (S112, S113). The multifunction device 10 then performs color conversion on the original image so that the representative values in the second characteristic quantity data approach those in the first characteristic quantity data (S114, S115).

According to the image correction process of the embodiment, if the original image includes a building and sky, for example, and the user wishes to convert the blue color of the sky to a brilliant ocean blue, the multifunction device 10 can perform this conversion through an operation using the scanner to scan a photograph of a brilliant ocean as the sample image.

Similarly, the multifunction device 10 can convert flesh tones in an original image of a person's profile to lighter tones through an operation using the scanner to scan a photograph showing the palm of a hand or the like with lighter flesh tones.

Hence, the user can perform desired image correction simply by scanning an image as a model for the image correction, and need not have any special knowledge of image processing since there is no need to input parameters and the like. Further, since the multifunction device 10 can automatically select hue-regions of an image to subject to correction, the multifunction device 10 can convert colors in only hue-regions that are easily perceived, while reducing or eliminating the conversion of less noticeable hue-regions.

In particular, by employing a plurality of sample images, the multifunction device 10 can perform color conversion on the original image by bringing together characteristic parts of all the sample images. Accordingly, the multifunction device 10 can achieve finer color conversion settings than when using a single sample image. Further, since the pixels constituting each sample image are sorted based on hue values, the multifunction device 10 can achieve excellent color conversion results by sorting these pixels based on human sensibilities.

At the same time, the multifunction device 10 inputs images scanned in a plurality of scanning regions divided within the document-supporting surface as independent sample images. Accordingly, the multifunction device 10 can easily scan a plurality of sample images to reduce a processing time.

Moreover, the multifunction device 10 determines that no image exists in a scanning region when the mean brightness $V_{mean}$ of the image scanned in that scanning region is greater than or equal to a threshold value $V_{Thre}$, thereby preventing areas in which no image exists from being inputted as a sample image.

4. Second Embodiment

Figure 11:
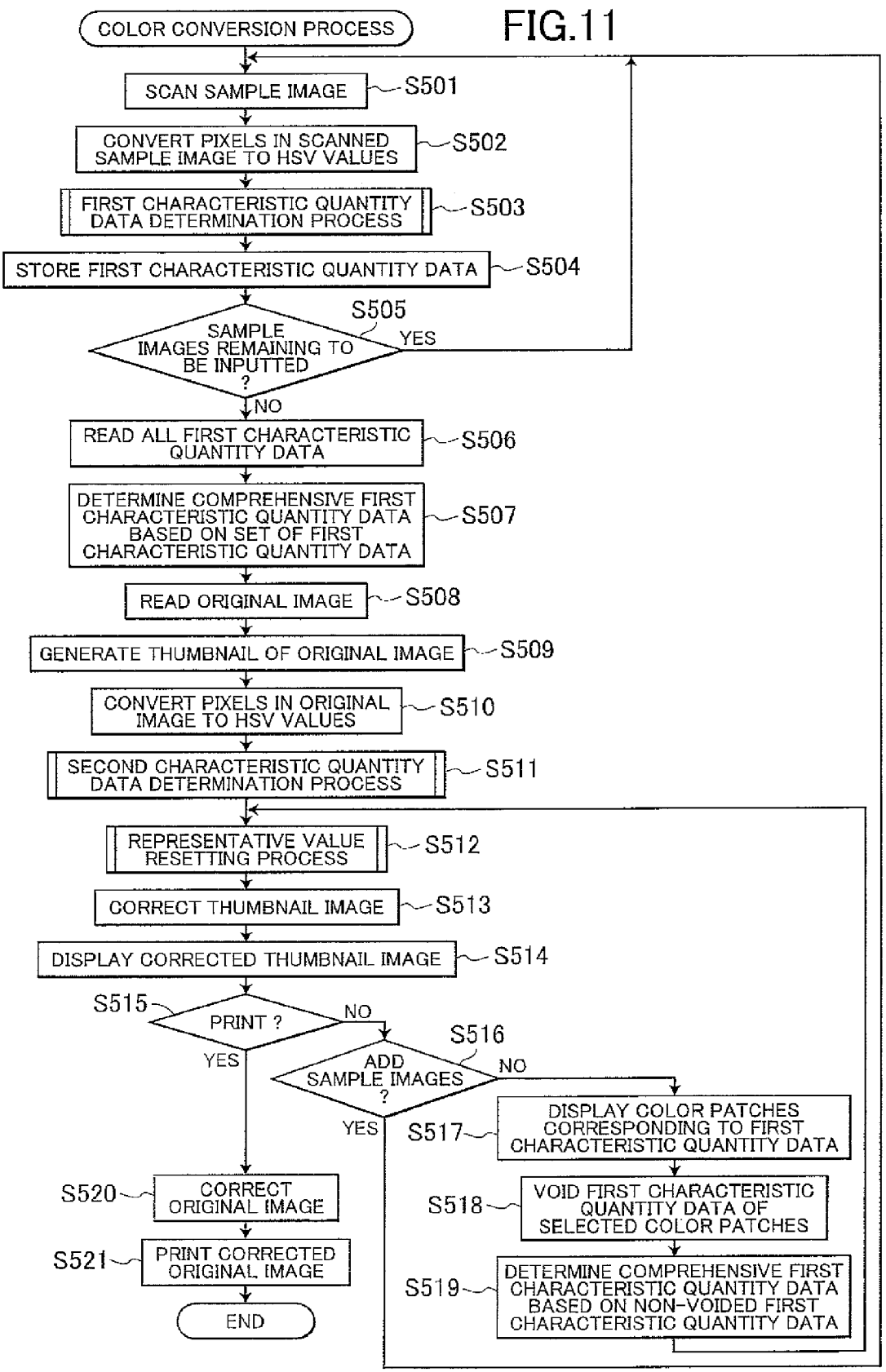
FIG. 11 is a flowchart illustrating steps in the color conversion process according to a second embodiment.

Next, a second embodiment of the present invention will be described while referring to the FIGS. 11-13. The multifunction device 10 according to the second embodiment differs from the multifunction device 10 in the first embodiment described above in that a color conversion process illustrated by the flowchart in FIG. 11 is performed in place of the color conversion process described above with reference to FIG. 4. The remaining configuration of the multifunction device 10 is identical to that in the first embodiment and will not be described here.

FIG. 11 is a flowchart illustrating steps in the color conversion process according to the second embodiment. In S501 at the beginning of this color conversion process, the CPU 71 scans the entire scanning region of the document-supporting surface in the image-reading unit 20 as a sample image. Thus, the CPU 71 reads at least a part of a document that is positioned within the scanning region of the document-supporting surface.

In S502 the CPU 71 performs a process to convert each pixel constituting the sample image to a set of HSV parameters according to the same conversion method as described above.

In S503 the CPU 71 performs the first characteristic quantity determining process described above. This process is the same as the process of S107 in FIG. 4 (in the first embodiment).

In S504 the CPU 71 stores the first characteristic quantity data determined in S503 in the RAM 73. If the first characteristic quantity data for a different sample image is already stored in the RAM 73 at this time, the CPU 71 maintains the saved state of this characteristic quantity data and adds the new first characteristic quantity data to the RAM 73. In other words, first characteristic quantity data stored in the RAM 73 is deleted therefrom only at the beginning and ending of this color conversion process, but is continuously saved after the process begins until the process ends. Hence, by repeating the process in S501-S504, the CPU 71 stores a plurality of set of first characteristic quantity data for a plurality of sample images in the RAM 73. Here, the location for storing the first characteristic quantity data is not limited to the RAM 73, but may be a hard disk, for example, if the multifunction device 10 is provided with a hard disk.

In S505 the CPU 71 determines whether there remains any document that has yet to be read. This determination can be made according to one of the methods (1)-(3) below, for example.

(1) Prompt the user at the beginning of the process to enter the number of sheets of document, from which sample images are desired to be scanned, and determine whether this number has been reached.

(2) Determine whether the user has pressed a prescribed button (the Print button, for example) after all documents have been read.

(3) Prompt the user at the beginning of the process to set a paper size equivalent to the total size of all documents, from which sample images are desired to be scanned, and determine whether this size has been met. This method is particularly useful when a document having a size larger than the document-supporting surface is scanned a plurality of times by sections.

The CPU 71 returns to S501 when determining in S505 that a sample image remains to be scanned. Accordingly, by repeatedly performing a document-scanning operation, the CPU 71 can scan a plurality of sample images.

However, if the CPU 71 determines in S505 that there remain no more sample images to scan (i.e., that all sample images have been scanned), in S506 the CPU 71 reads all set of first characteristic quantity data that were stored in the RAM 73 in S504.

In S507 the CPU 71 determines a set of comprehensive first characteristic quantity data representing the overall characteristics of the plurality of sample images based on the set of first characteristic quantity data read in S506.

Next, a method of determining the comprehensive first characteristic quantity data according to the present embodiment will be described.

In the following example, three sample images A-C are scanned by the image-reading unit 20.

The first characteristic quantity data of sample image A are defined as follows.
Representative values for the R hue-region: sHr(A), sSr(A), sVr(A)
Representative values for the G hue-region: sHg(A), sSg(A), sVg(A)
Representative values for the B hue-region: sHb(A), sSb(A), sVb(A)
Representative values for the C hue-region: sHc(A), sSc(A), sVc(A)
Representative values for the M hue-region: sHm(A), sSm(A), sVm(A)
Representative values for the Y hue-region: sHy(A), sSy(A), sVy(A)
Percentage that the R hue-region occupies in the sample image A: sRateR(A)
Percentage that the G hue-region occupies in the sample image A: sRateG(A)
Percentage that the B hue-region occupies in the sample image A: sRateB(A)
Percentage that the C hue-region occupies in the sample image A: sRateC(A)
Percentage that the M hue-region occupies in the sample image A: sRateM(A)
Percentage that the Y hue-region occupies in the sample image A: sRateY(A)

The first characteristic quantity data of sample image B are defined as follows.
Representative values for the R hue-region: sHr(B), sSr(B), sVr(B)
Representative values for the G hue-region: sHg(B), sSg(B), sVg(B)
Representative values for the B hue-region: sHb(B), sSb(B), sVb(B)
Representative values for the C hue-region: sHc(B), sSc(B), sVc(B)
Representative values for the M hue-region: sHm(B), sSm(B), sVm(B)
Representative values for the Y hue-region: sHy(B), sSy(B), sVy(B)
Percentage that the R hue-region occupies in the sample image B: sRateR(B)
Percentage that the G hue-region occupies in the sample image B: sRateG(B)
Percentage that the B hue-region occupies in the sample image B: sRateB(B)
Percentage that the C hue-region occupies in the sample image B: sRateC(B)
Percentage that the M hue-region occupies in the sample image B: sRateM(B)
Percentage that the Y hue-region occupies in the sample image B: sRateY(B)

The first characteristic quantity data of sample image C are defined as follows.
Representative values for the R hue-region: sHr(C), sSr(C), sVr(C)
Representative values for the G hue-region: sHg(C), sSg(C), sVg(C)
Representative values for the C hue-region: sHb(C), sSb(C), sVb(C)
Representative values for the C hue-region: sHc(C), sSc(C), sVc(C)
Representative values for the M hue-region: sHm(C), sSm(C), sVm(C)
Representative values for the Y hue-region: sHy(C), sSy(C), sVy(C)
Percentage that the R hue-region occupies in the sample image C: sRateR(C)
Percentage that the G hue-region occupies in the sample image C: sRateG(C)
Percentage that the C hue-region occupies in the sample image C: sRateC(C)
Percentage that the C hue-region occupies in the sample image C: sRateC(C)
Percentage that the M hue-region occupies in the sample image C: sRateM(C)
Percentage that the Y hue-region occupies in the sample image C: sRateY(C)

The comprehensive first characteristic quantity data of these sample images A-C are defined as follows.
Comprehensive representative values for the R hue-region: sHr, sSr, sVr
Comprehensive representative values for the G hue-region: sHg, sSg, sVg
Comprehensive representative values for the B hue-region: sHb, sSb, sVb
Comprehensive representative values for the C hue-region: sHc, sSc, sVc
Comprehensive representative values for the M hue-region: sHm, sSm, sVm
Comprehensive representative values for the Y hue-region: sHy, sSy, sVy
Comprehensive percentage for the R hue-region: sRateR
Comprehensive percentage for the G hue-region: sRateG
Comprehensive percentage for the B hue-region: sRateB
Comprehensive percentage for the C hue-region: sRateC
Comprehensive percentage for the M hue-region: sRateM
Comprehensive percentage for the Y hue-region: sRateY For example, comprehensive representative values for the R hue-region in the comprehensive first characteristic quantity data are found as follows.

$$sHr=\{(sHr(A) \times sRateR(A))$$
$$=(sHr(B) \times sRateR(B))$$
$$=(sHr(C) \times sRateR(C))\}$$
$$/(sRateR(A)+sRateR(B)+sRateR(C))$$
$$sSr=((sSr(A) \times sRateR(A))$$
$$+(sSr(B) \times sRateR(B))$$
$$+(sSr(C) \times sRateR(C))$$
$$/(sRateR(A)+sRateR(B)+sRateR(C))$$
$$sVr=\{(sVr(A) \times sRateR(A))$$
$$+(sVr(B) \times sRateR(B))$$
$$+(sVr(C) \times sRateR(C))$$
$$/(sRateR(A)+sRateR(B)+sRateA(C))\}$$

With this method, average values are calculated for the comprehensive representative values with consideration for the percentage that the hue-region occupies in each sample image, but without accounting for differences in the relative sizes of the sample images. Comprehensive representative values for other hue-regions are similarly calculated.

The comprehensive percentage for each hue-region is calculated as follows.

$$sRateR=(sRateR(A)+sRateR(B)+sRateR(C))/3$$

$$sRateG=(sRateG(A)+sRateG(B)+sRateG(C))/3$$

$$sRateB=(sRateB(A)+sRateB(B)+sRateB(C))/3$$

$$sRateC=(sRateC(A)+sRateC(B)+sRateC(C))/3$$

$$sRateM=(sRateM(A)+sRateM(B)+sRateM(C))/3$$

$$sRateY=(sRateY(A)+sRateY(B)+sRateY(C))/3$$

In S508 the CPU 71 loads the image to be subjected to color conversion (original image) from the memory card into the RAM 73.

In S509 the CPU 71 generates a thumbnail image for the original image read in S508. In other words, the CPU 71 performs a size conversion process to reduce the original image to a preset size for a thumbnail image. Since original images are generally larger than the thumbnail image size, a reducing process is described here as the size conversion process. However, if the original image is smaller than the thumbnail image size, an enlarging process is performed as the size conversion process.

In S510 the CPU 71 performs a process to convert each pixel in the original image read in S508 to a set of HSV parameters. In S511 the CPU 71 performs the second characteristic quantity data determination process for determining a set of second characteristic quantity data denoting a characteristic of the original image based on the HSV parameters obtained in the conversion process of S510. This process is the same as the process of S113 in FIG. 4 (in the first embodiment).

In S512 the CPU 71 performs the representative value resetting process for resetting the values of the first and second characteristic quantity data. This representative value resetting process is same as the process of S114 in FIG. 4 (in the first embodiment).

In S513 the CPU 71 corrects the thumbnail image based on the comprehensive first characteristic quantity data and the second characteristic quantity data determined in S507. This method of correction is the same as that executed in S115 in the first embodiment except that the targeted image is the thumbnail image of the original image rather than the original image.

Figure 12:
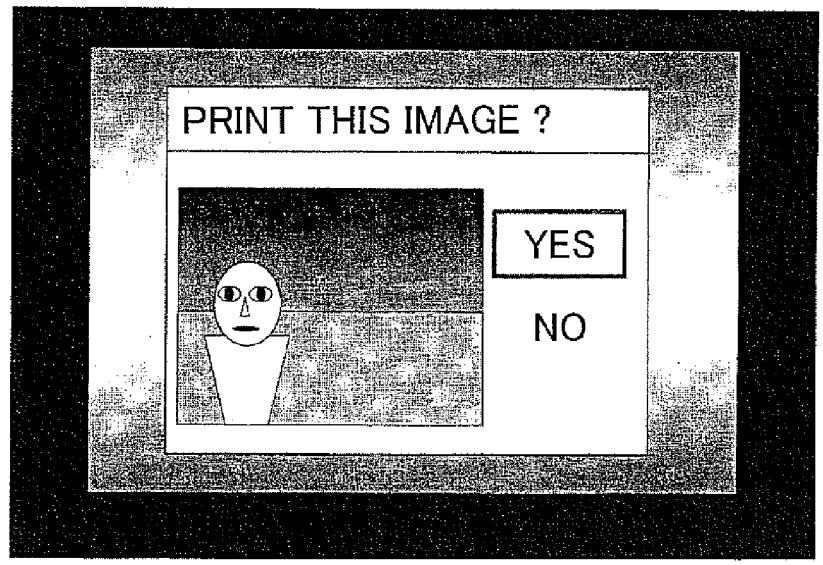
FIG. 12 is an explanatory diagram illustrating a display screen.

In S514 the CPU 71 displays on the display section 32 the thumbnail image corrected in S513 (hereinafter referred to as the "corrected thumbnail image") along with a message prompting the user to confirm that the corrected result is satisfactory for printing as shown in FIG. 12.

In S515 the CPU 71 determines whether to print the original image based on an operation the user performs on the operating section 31 in response to viewing the content displayed on the display section 32 in S514. If the user has indicated not to print the image (S515: NO), then in S516 the CPU 71 determines whether the user wishes to add more sample images or not (i.e., whether to remove sample images). Specifically, the CPU 71 displays a message on the display section 32 prompting the user to indicate through operations on the operating section 31 whether to increase or decrease the number of sample images employed and determines the user's preference based on this input operation.

If the CPU 71 determines in S516 that the user wishes to increase the number of sample images (S516: YES), the CPU 71 returns to S501 and scans one or more new sample image. However, if the CPU 71 determines that the user wishes to decrease the number of sample images (S516: NO), then in S517 the CPU 71 displays color patches corresponding to all sets of first characteristic quantity data stored in the RAM 73 in S504 on the display section 32. In S503, pixels constituting each sample image are sorted into six hue-regions according to hue, and the first characteristic quantity data includes representative values for each hue-region. In S517 the CPU 71 displays color patches that are determined based on the representative values for the six hue-regions of each sample image.

The user selects one or more sample image, which he/she desires to void. In S518 the CPU 71 voids the first characteristic quantity data corresponding to color patches that the user has selected through operations on the operating section 31. In other words, the CPU 71 eliminates sample images corresponding to the selected color patches from among the plurality of sample images scanned by the image-reading unit 20 (i.e., deletes the first characteristic quantity data of these sample images from the plurality of first characteristic quantity data stored in the RAM 73).

In S519 the CPU 71 again determines the comprehensive first characteristic quantity data according to the same method in S507 based on the remaining first characteristic quantity data stored in the RAM 73, i.e., the first characteristic quantity data that have not been deleted, and subsequently returns to S512.

On the other hand, if the CPU 71 determines in S515 that the user wishes to print the image, in S520 the CPU 71 corrects the original image (rather than the thumbnail image) based on the comprehensive first characteristic quantity data determined in S507 and the second characteristic quantity data determined in S511. This process is the same as the process of S115 in FIG. 4 (in the first embodiment).

In S521 the CPU 71 controls the image-printing unit 40 to print the original image corrected in S520, and subsequently ends the color conversion process.

As described above, the multifunction device according to the second embodiment acquires a plurality of sample images from the image-reading unit 20 (S501-S505), and determines comprehensive first characteristic quantity data representing the overall characteristics of the inputted sample images (S502-S504, S506, S507). The multifunction device 10 also inputs the original image targeted for color conversion from the memory card (S508), and determines the second characteristic quantity data representing the characteristics of the original image (S510, S511). The multifunction device 10 then performs color conversion on the original image so that the second characteristic quantity data approaches the comprehensive first characteristic quantity data (S512, S520).

With the multifunction device 10 according to the second embodiment, the user can instruct the multifunction device 10 to perform color conversion based on characteristics of a plurality of sample images. Accordingly, the user can produce colors not present in any of the available sample images indirectly by combining colors of the plurality of sample images. Hence, the multifunction device 10 can perform color conversion that more accurately reflects the user's desire than when only a single sample image is used.

Specifically, after each sample image is inputted (S501), the multifunction device 10 determines and stores the first characteristic quantity data expressing the characteristics of this sample image (S502-S504), and subsequently determines comprehensive first characteristic quantity data based on the first characteristic quantity data for all sample images (S506, S507). In this way, it is not necessary to store all inputted sample images at the same time, thereby reducing the amount of storage capacity required for storing sample images.

Figure 13:
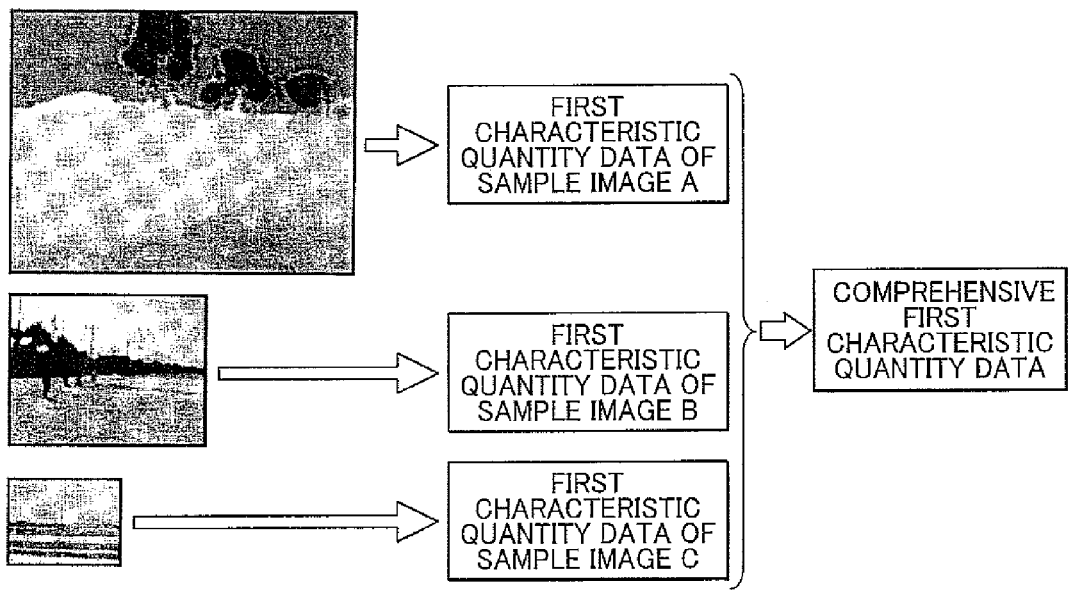
FIG. 13 is a conceptual diagram showing a method for determining comprehensive first characteristic quantity data according to the second embodiment.

Further, the multifunction device 10 according to the second embodiment determines the comprehensive first characteristic quantity data based solely on the first characteristic quantity data of all sample images, without consideration, for differences in relative sizes of the inputted sample images, as illustrated in FIG. 13. Therefore, the multifunction device 10 can perform color conversion without being influenced by different sizes of sample images, when the sample images being used are not of the same size.

The multifunction device 10 displays the corrected thumbnail image showing the results of the color conversion process on the display section 32 prior to printing the image (S514). Thus, the user can easily judge whether the desired color conversion results were obtained based on the corrected thumbnail image. If the corrected thumbnail image displayed on the display section 32 does not show, the desired results of color conversion, the user can add new sample images to be used for the color conversion process or remove unnecessary sample images (S515-S519). Hence, the user can fine-tune the color conversion process without performing wasteful printing until the intended results of color conversion are obtained.

Further, since the corrected thumbnail image is generated by performing the color conversion process on a reduced image of the original image, the process for generating this corrected thumbnail image is much simpler than performing the color conversion process on the original image itself.

5. Third Embodiment

Figure 14:
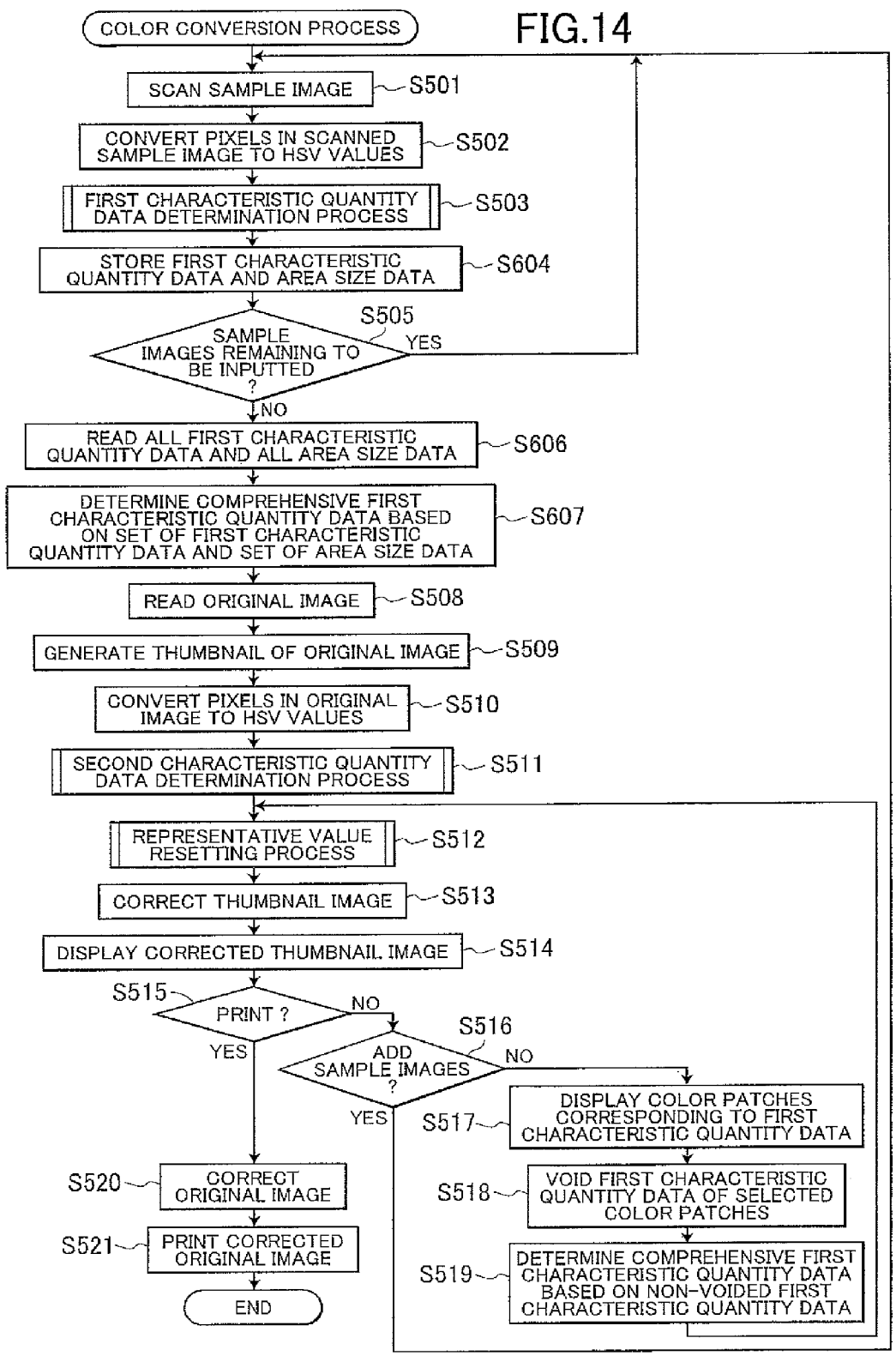
FIG. 14 is a flowchart illustrating steps in the color conversion process according to a third embodiment.

Next, the multifunction device 10 according to a third embodiment will be described. The multifunction device 10 according to the third embodiment differs from the multifunction device 10 in the first embodiment described above in that a color conversion process illustrated by the flowchart in FIG. 14 is performed in place of the color conversion process described above with reference to FIG. 4. The remaining configuration of the multifunction device 10 is identical to that in the first embodiment and will not be described here.

In the color conversion process of FIG. 14, processes performed in S604, S606, and S607 differ partially from the processes performed in S504, S506, and S507 in FIG. 11. Processes performed in the remaining steps S501-S503, S505, and S508-S521 are identical to the processes shown in FIG. 11. Accordingly, the following description will focus on the differing processes.

In S604 the CPU 71 stores the first characteristic quantity data determined for the scanned sample image in S503 in the RAM 73 together with a set of area size data indicative of sizes of areas in the sample image that are used in determining the first characteristic quantity data for the respective hue-regions. Here, "area size data" indicates the number of constituent pixels of the sample image, which are used for calculating the representative values of each hue-region (i.e., the number of constituent pixels belonging to each hue-region). If a set of first characteristic quantity data and set of area size data for a different sample image is already stored in the RAM 73 at this time, the CPU 71 maintains the saved state of this characteristic quantity data and area size data and adds the new first characteristic quantity data and area size data.

In S606 the CPU 71 reads all sets of first characteristic quantity data and all sets of area size data that were stored in the RAM 73 in S604. In S607 the CPU 71 determines a set of comprehensive first characteristic quantity data representing the overall characteristics of the plurality of sample images based on the first characteristic quantity data and area size data read in S606.

In the following example, three sample images A-C are scanned by the image-reading unit 20, and the first characteristic quantity data and the area size data for these sample images A-C are defined as follows.

First characteristic quantity data and area size data for sample image A
Representative values of the R hue-region: sHr(A), sSr(A), sVr(A)
Representative values of the G hue-region: sHg(A), sSg(A), sVg(A)
Representative values of the B hue-region: sHb(A), sSb(A), sVb(A)
Representative values of the C hue-region: sHc(A), sSc(A), sVc(A)
Representative values of the M hue-region: sHm(A), sSm(A), sVm(A)
Representative values of the Y hue-region: sHy(A), sSy(A), sVy(A)
Percentage of the sample image A occupied by the R hue-region: sRateR(A)
Percentage of the sample image A occupied by the G hue-region: sRateG(A)
Percentage of the sample image A occupied by the B hue-region: sRateB(A)
Percentage of the sample image A occupied by the C hue-region: sRateC(A)
Percentage of the sample image A occupied by the H hue-region: sRateM(A)
Percentage of the sample image A occupied by the Y hue-region: sRateY(A)
Area size data used for calculating the first characteristic quantity data of the R hue-region (pixels): sAreaR(A)
Area size data used for calculating the first characteristic quantity data of the G hue-region (pixels): sAreaG(A)
Area size data used for calculating the first characteristic quantity data of the B hue-region (pixels): sAreaB(A)
Area size data used for calculating the first characteristic quantity data of the C hue-region (pixels): sAreaC(A)
Area size data used for calculating the first characteristic quantity data of the m hue-region (pixels): sAreaM(A)
Area size data used for calculating the first characteristic quantity data of the Y hue-region (pixels): sAreaY(A)

First characteristic quantity data and area size data for sample image B
Representative values of the R hue-region: sHr(B), sSr(B), sVr(B)
Representative values of the G hue-region: sHg(B), sSg(B), sVg(B)
Representative values of the B hue-region: sHb(B), sSb(B), sVb(B)

Representative values of the C hue-region: sHc(B), sSc(B), sVc(B)
Representative values of the M hue-region: sHm(B), sSm(B), sVm(B)
Representative values of the Y hue-region: sHy(B), sSy(B), sVy(B)
Percentage of the sample image B occupied by the R hue-region: sRateR(B)
Percentage of the sample image B occupied by the G hue-region: sRateG(B)
Percentage of the sample image B occupied by the B hue-region: sRateB(B)
Percentage of the sample image B occupied by the C hue-region: sRateC(B)
Percentage of the sample image B occupied by the M hue-region: sRateM(B)
Percentage of the sample image B occupied by the Y hue-region: sRateY(B)
Area size data used for calculating the first characteristic quantity data of the R hue-region (pixels): sAreaR(B)
Area size data used for calculating the first characteristic quantity data of the G hue-region (pixels): sAreaG(B)
Area size data used for calculating the first characteristic quantity data of the B hue-region (pixels): sAreaB(B)
Area size data used for calculating the first characteristic quantity data of the C hue-region (pixels).: sAreaC(B)
Area size data used for calculating the first characteristic quantity data of the M hue-region (pixels): sAreaM(B)
Area size data used for calculating the first characteristic quantity data of the Y hue-region (pixels): sAreaY(B)

First characteristic quantity data and area size data for sample image C
Representative values of the R hue-region: sHr(C), sSr(C), sVr(C)
Representative values of the G hue-region: sHg(C), sSg(C), sVg(C)
Representative values of the B hue-region: sHb(C), sSb(C), sVb(C)
Representative values of the C hue-region: sHc(C), sSc(C), sVc(C)
Representative values of the M hue-region: sHm(C), sSm(C), sVm(C)
Representative values of the Y hue-region: sHy(C), sSy(C), sVy(C)
Percentage of the sample image C occupied by the R hue-region: sRateR(C)
Percentage of the sample image C occupied by the G hue-region: sRateG(C)
Percentage of the sample image C occupied by the B hue-region: sRateB(C)
Percentage of the sample image C occupied by the C hue-region: sRateC(C)
Percentage of the sample image C occupied by the M hue-region: sRateM(C)
Percentage of the sample image C occupied by the Y hue-region: sRateY(C)
Area size data used for calculating the first characteristic quantity data of the R hue-region (pixels): sAreaR(C)
Area size data used for calculating the first characteristic quantity data of the G hue-region (pixels): sAreaG(C)
Area size data used for calculating the first characteristic quantity data of the B hue-region (pixels): sAreaB(C)
Area size data used for calculating the first characteristic quantity data of the C hue-region (pixels): sAreaC(C)
Area size data used for calculating the first characteristic quantity data of the M hue-region (pixels): sAreaM(C)
Area size data used for calculating the first characteristic quantity data of the Y hue-region (pixels): sAreaY(C)

Further, the comprehensive first characteristic quantity data determined in S607 includes comprehensive representative values for each hue-region (HSV values) and the comprehensive percentage for each hue-region. These comprehensive representative values and percentages are defined as follows.

Comprehensive representative values for the R hue-region: sHr, sSr, sVr
Comprehensive representative values for the G hue-region: sHg, sSg, sVg
Comprehensive representative values for the B hue-region: sHb, sSb, sVb
Comprehensive representative values for the C hue-region: sHc, sSc, sVc
Comprehensive representative values for the M hue-region: sHm, sSm, sVm
Comprehensive representative values for the Y hue-region: sHy, sSy, sVy
Comprehensive percentage for the R hue-region: sRateR
Comprehensive percentage for the G hue-region: sRateG
Comprehensive percentage for the B hue-region: sRateB
Comprehensive percentage for the C hue-region: sRateC
Comprehensive percentage for the M hue-region: sRateM
Comprehensive percentage for the Y hue-region: sRateY The comprehensive representative values determined in S607 are set to the average values of the representative values in the first characteristic quantity data for sample images A-C (the average values weighted based on the area sizes).

For example, comprehensive representative values for the R hue-region in the comprehensive first characteristic quantity data are found as follows.

sHr={(sHr(A)×sAreaR(A))
+(sHr(B)×sAreaR(B))
+(sHr(C)×sAreaR(C))}
/(sAreR(A)+sAreaR(B)+sAreaR(C))
sSr={(sSr(A)×sAreaR(A))
+(sSr(B)×sAreaR(B))
+(sSr(C)×sAreaR(C))}
/(sAeaR(A)+sAreaR(B)+sAreaR(C))
sVr={(sVr(A)×sAreaR(A))
+(sVr(B)×sAreaR(B))
+(sVr(C)×sAreaR(C))
/(sAreaR(A)+sAreaR(B)+sAreaR(C))}

In this way, the average value of the representative values is calculated while accounting for differences in the relative sizes of the sample images. Representative values for other hue-regions are similarly calculated.

According to the present embodiment, the comprehensive percentage is equal to the percentage that each hue-region occupies in the total area (total pixel number) of the sample images. The comprehensive percentage is calculated as follows.

First, the multifunction device 10 calculates a size of total area of each color.

$$sumAreaR = sAreaR(A) + sAreaR(B) + sAreaR(C)$$

$$sumAreaG = sAreaG(A) + sAreaG(B) + sAreaG(C)$$

$$sumAreaB = sAreaB(A) + sAreaB(B) + sAreaB(C)$$

$$sumAreaC = sAreaC(A) + sAreaC(B) + sAreaC(C)$$

$$sumAreaM = sAreaM(A) + sAreaM(B) + sAreaM(C)$$

$$sumAreaY = sAreaY(A) + sAreaY(B) + sAreaY(C)$$

Next, the multifunction device 10 calculates the total of all color areas.

sumArea=sumArea$R$+sumArea$G$+sumArea$B$+sumArea$C$+sumArea$M$+sumArea$Y$

This sumArea is used for calculating the percentage occupied by each hue-region (comprehensive percentage).

Comprehensive percentage for the $R$ hue-region:
sRate$R$=sumArea$R$/sumArea

Comprehensive percentage for the $G$ hue-region:
sRate$G$=sumArea$G$/sumArea

Comprehensive percentage for the $B$ hue-region:
sRate$B$=sumArea$B$/sumArea

Comprehensive percentage for the $C$ hue-region:
sRate$C$=sumArea$C$/sumArea

Comprehensive percentage for the $M$ hue-region:
sRate$M$=sumArea$M$/sumArea

Comprehensive percentage for the $Y$ hue-region:
sRate$Y$=sumArea$Y$/sumArea

Figure 15:
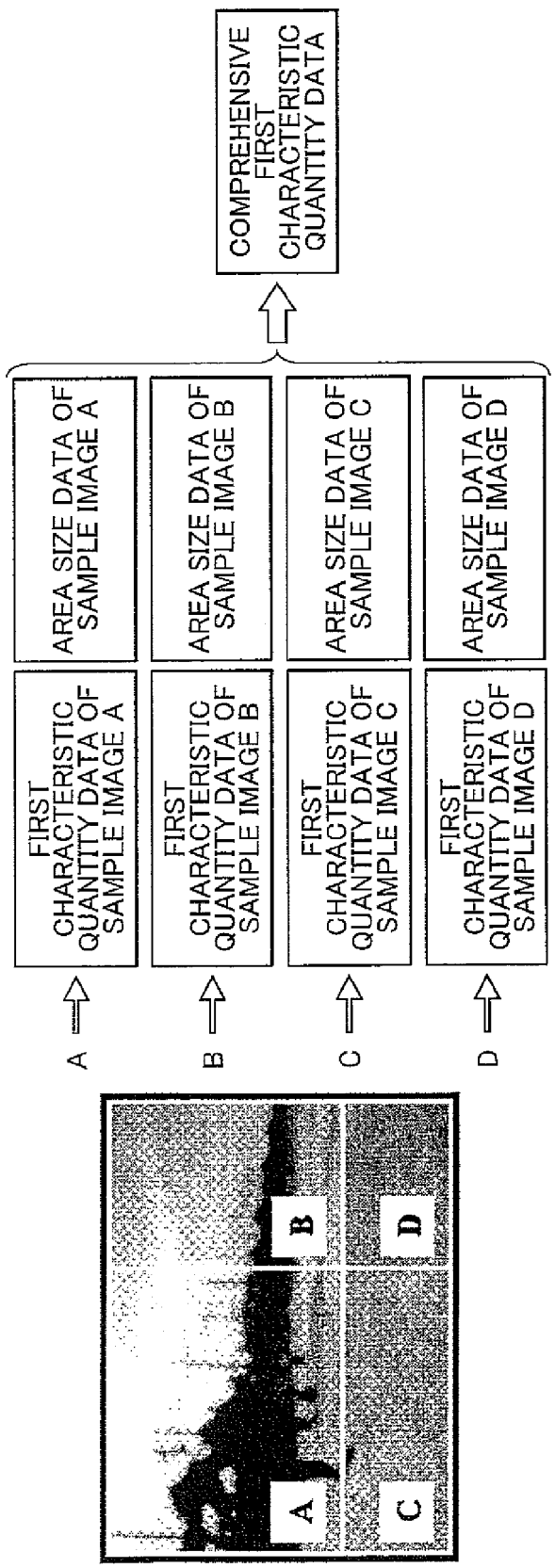
FIG. 15 is a conceptual diagram showing a method for determining comprehensive first characteristic quantity data according to the third embodiment.

As described above, the multifunction device according to the third embodiment determines one set of comprehensive first characteristic quantity data for a plurality of inputted sample images based on the first characteristic quantity data of each the sample images and the area size data of the hue-regions in the sample image used for determining the first characteristic quantity data, as illustrated in FIG. 15. Accordingly, the multifunction device 10 can combine colors from a plurality of sample images while reflecting differences in the relative sizes of the sample images. Hence, if the user wishes to use an image having a size larger than the document-supporting surface of the image-reading unit 20 as sample images, for example, by scanning this image a plurality of times by sections, the user can approximate the same color conversion process performed when the source image is read at one time.

6. Fourth Embodiment

Figure 16:
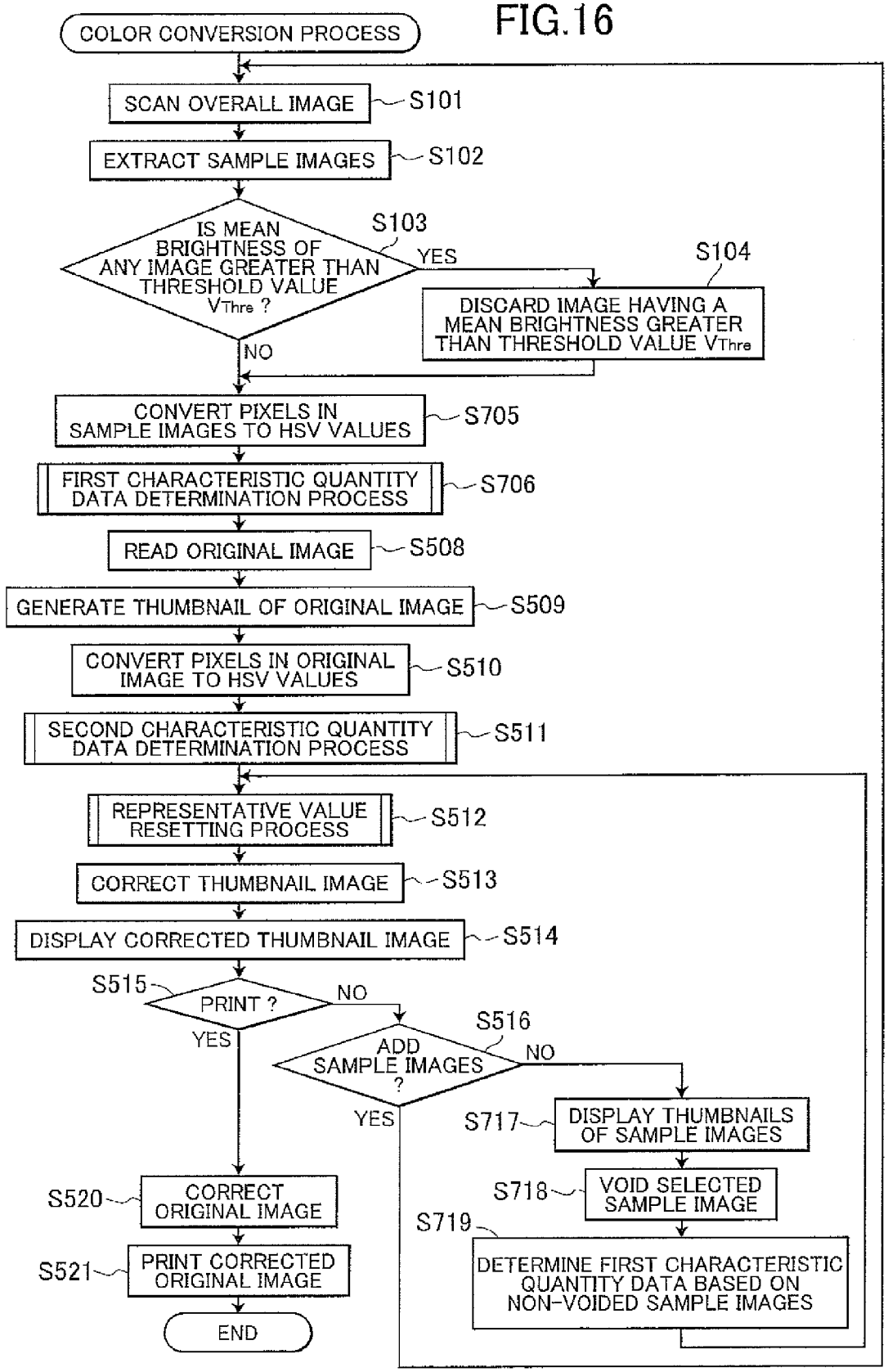
FIG. 16 is a flowchart illustrating steps in the color conversion process according to a fourth embodiment.

Next, the multifunction device 10 according to a fourth embodiment will be described. The multifunction device 10 according to the fourth embodiment differs from the multifunction device 10 in the first embodiment described above in that a color conversion process illustrated by the flowchart in FIG. 16 is performed in place of the color conversion process described above with reference to FIG. 4. The remaining configuration of the multifunction device 10 is identical to that in the first embodiment and will not be described here.

The color conversion process of FIG. 16 is obtained by combining the processes of S101-S104 in FIG. 4 (in the first embodiment) and the processes of S508-S516, S520, and S521 in FIG. 11 (in the second embodiment), and by adding new processes of S705, S706, and S717-S719. Accordingly, the following description will focus on the processes of S705, S706, and S717-S719.

In S705 the CPU 71 performs a process to convert each pixel in the sample image determined in S101-S104 to a set of HSV parameters. At this time, the CPU 71 treats the plurality of sample images determined through the processes of S101-104 as a single composite sample image, into which the plurality of sample images are merged. When converting RGB values to HSV parameters and HSV parameters to RGB values, the CPU 71 employs the equations described above.

In S706 the CPU 71 performs a first characteristic quantity data determination process for determining first characteristic quantity data (equivalent to the comprehensive first characteristic quantity data of the plurality of sample images in the third embodiment) representing characteristics of the composite sample image based on the HSV parameters obtained in the conversion process of S705. The first characteristic quantity data determination process is identical to the first characteristic quantity data determining process described with reference to FIG. 6 in the first embodiment.

In S717, the CPU 71 generates thumbnail images of the sample images extracted in S102 and displays these thumbnail images on the display section 32. The user selects one or more sample image, which he/she desires to void. In S718 the CPU 71 voids sample images corresponding to thumbnail images that the user selects through operations on the operating section 31. In other words, the CPU 71 eliminates sample images corresponding to the selected thumbnail images from among the plurality of sample images extracted in S102.

In S719, the CPU 71 again determines the first characteristic quantity data according to the same method in S705 and S706 described above based on the remaining sample images that have not been voided in S718, and subsequently returns to S512.

As described above, the multifunction device 10 according to the fourth embodiment determines the comprehensive first characteristic quantity data expressing the characteristics of a single composite image, into which merged are a plurality of sample images. In this way, the multifunction device 10 can combine colors in a plurality of sample images while accounting for differences in the relative sizes of the sample images. Hence, if the user wishes to use an image having a size larger than the document-supporting surface of the image-reading unit 20 as a sample image, for example, by scanning this image a plurality of times in sections, the user can approximate the same color conversion process performed when the source image is read at one time.

7. Modifications (1) The first and fourth embodiments describe a case in which the multifunction device 10 inputs images scanned from a plurality of scanning regions divided within the document-supporting surface as independent sample images, but the present invention is not limited to this configuration. For example, the multifunction device 10 may scan the entire document-supporting surface as a single image and subsequently extract individual images by analyzing the content of the overall image. With this configuration, the multifunction device 10 can extract a plurality of images as independent sample images, irrespective of their positions on the document-supporting surface. Further, in the second and third embodiments, one document has only a single sample image. However, one document may have a plurality of images printed thereon, and the multifunction device 10 can extract each of these images as an independent sample image.

(2) While a plurality of sample images is read at once in the example of the first and fourth embodiments, the multifunction device 10 may repeatedly perform an operation to read sample images, acquiring one sample image at a time. This method can reliably prevent a single image from being misinterpreted as a plurality of images or, conversely, a plurality of images as a single image.

(3) While the multifunction device 10 scans sample images with the image-reading unit 20 in the embodiments, the present invention is not limited to this configuration. For example, the multifunction device 10 may set images read from a memory card or images received from an external source via the communication section 60 as the sample images.

(4) In the first embodiment described above, representative values of pixels occupying the largest percentage among the sample images are selected for each hue-region, but the present invention is not limited to this configuration. For example, it is possible to give priority to representative values for a hue-region that occupies the greatest percentage of each sample image. Specifically, if there are two sample images A and B and the R hue-region is the largest-area hue-region in sample image A but not in sample image B, representative values for sample image A are selected for the R hue-region, even when the percentage of sample image A occupied by the R hue-region is less than the percentage of sample image B occupied by the R hue-region. Similarly, if the Y hue-region is the largest-area hue-region in sample image B but not in sample image A, representative values for sample image B are selected for the Y hue-region, even when the percentage, of sample image B occupied by the Y hue-region is less than the percentage of sample image A occupied by the Y hue-region. The other remaining hue-regions are not the largest-area hue-regions for any of the sample images A and B. So, for each of the other remaining hue-regions, representative values for one of the sample images A and B whose percentage occupied by the subject hue-region is greater than the other, are selected for the subject hue-region. This method gives priority to the most reverent hues in each sample image.

(5) In the embodiments described above, images to undergo color conversion are inputted from a memory card, but the present invention is not limited to this configuration. For example, images scanned by the image-reading unit 20 or images received from an external source via the communication section 60 may be subjected to color conversion.

(6) In the color conversion process of the embodiments described above, a process is performed to convert pixels In the sample image and original image to HSV parameters prior to the process for determining the first and second characteristic quantity data, but the present invention is not limited to this process. For example, pixels may be converted to other parameters than HSV parameters, such as L*c*h* parameters or RGB parameters.

(7) In the embodiments described above, the second characteristic quantity data is determined after determining the first characteristic quantity data in the color conversion process, but the first characteristic quantity data may be determined after determining the second characteristic quantity data.

(8) In the embodiments described above, the algorithm for determining the first characteristic quantity data is identical to the algorithm for determining the second characteristic quantity data, but different algorithms may be used.

(9) In the embodiment described above, the representative value resetting process is performed to suspend part of the correction process based on the size of hue-regions and to reduce the amount of conversions. However, it is not necessary to perform the representative value resetting process.

(10) In the embodiments described above, a color conversion process is used as an example of the image correction process, but an image correction process other than that described in the embodiments may be performed.

(11) While the amount of conversion for H values in the hue-regions not targeted for conversion can be reduced in the image correction process of the embodiments, the conversion may not be completely eliminated. This is because the H values in hue-regions not targeted for conversion are affected by the representative values in other hue-regions, since linear interpolation is performed using representative values of hue-regions not targeted for conversion, as illustrated in FIG. 10.

Figure 17:
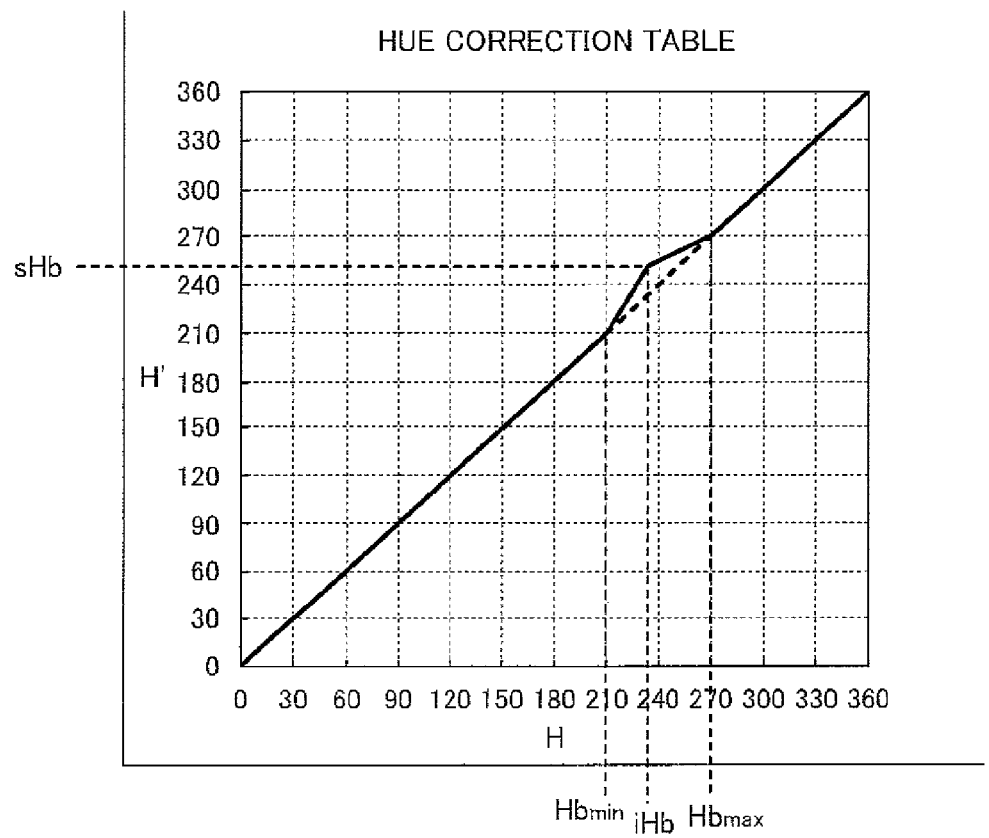
FIG. 17 is a graph for a hue correction table according to a variation of the embodiments.
Figure 18:
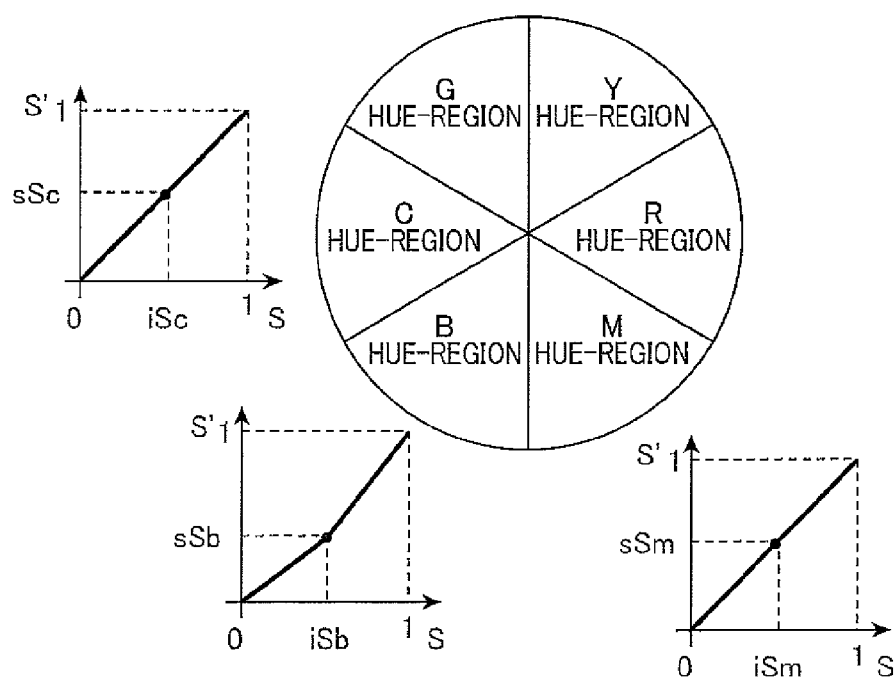
FIG. 18 shows graphs for three color hue-regions illustrating saturation correction tables according to a modification.

According to this modification, the hue correction table of FIG. 10 is further modified as shown in the graph in FIG. 17. FIG. 17 shows the hue correction table targeting only the B hue-region for conversion. While only one hue-region is targeted for conversion in FIG. 17, it is also possible to target a plurality of hue-regions.

In FIG. 17, H'=H for values outside the B hue-region, and thus image correction is not performed in these hue-regions. The value of H' in the B hue-region can be found with the following equation, where $Hb_{min}$ is the smallest value of H (210) in the B hue-region and $Hb_{max}$ is the largest value in the B hue-region (270).

When H<iHb, $$H'=Hb\text{min}+(sHb-Hb\text{min})\times(H-Hb\text{min})\div(iHb-Hb\text{min}),$$

When B>iHb, $$H'=sHb+(Hb\text{max}-sHb)\times(H-iHb)\div(Hb\text{max}-iHb).$$

Hence, the above equations can be used to convert pixels in only the targeted hue-region. By converting H values only in the hue-region targeted for conversion, the effects of image correction can be enhanced.

(12) As described above, an independent correction curve (conversion equation 2 or 3) is used for the S values at each hue-region in the image correction processes of S115, S513, and S520 according to the embodiments. So, there is a danger of generating false contour (tone jump). More specifically, a table indicating the relationship between S and S' is provided for each hue-region, as shown in FIG. 12, without consideration for the properties of tables for adjacent hue-regions. Similarly, the V value correction curves (conversion equation 4 or 5) for the respective hue-regions are also independent from one another in the image correction process according to the embodiments.

In the modification, tone jump can be prevented by modifying the correction curves in the respective hue-regions so that the correction curves will smoothly change through the hue-regions as shown in FIG. 19.

According to the modification, the image correction process for correcting the hue value and the S value of a pixel is executed in S115, S513 and S520 while modifying the correction curves. The process according to the modification will be described next in detail with reference to FIGS. 20 and 21. Following explanation is for the case where the hue value of a pixel targeted for conversion falls in the B hue-region and is nearer to the C hue-region than to the M hue-region. However, the process is essentially the same for other cases.

The value S of the pixel targeted for conversion, is converted into a modified, converted value S" according to equation 7 below using the following parameters.

H: The hue value for the pixel (see FIGS. 20 and 21)
S: The saturation value for the pixel (see FIG. 20)
$Hb_{mid}$: The middle hue value (240) in a target hue-region (B hue-region in this example), where the hue value H of the pixel falls (see FIG. 21)
$Hc_{mid}$: The middle hue value (180) in another hue-region (C hue-region, in this example) that is adjacent to the target hue-region on a side near the hue coordinate position of the hue value H of the pixel (see FIG. 21)
Sb': A B-region-dependent converted saturation value for the pixel, which is calculated by using the above-described equation 2 or 3 (the saturation correction table) for the B hue-region based on the saturation value S of the pixel as shown in FIG. 20 (see FIG. 20)
Sc': A C-region-dependent converted saturation value for the pixel, which is calculated by using the above-described equation 2 or 3 (the saturation correction table) for the C hue-region based on the saturation value S of the pixel as shown in FIG. 20 (see FIG. 20)

$$S''=\{(H-Hc_{mid})\times Sb'+(Hb_{mid}-Hc_{mid})\}$$ (Equation 7)

The value V of the pixel targeted for conversion is converted into a modified, converted value V" according to equation 8 below using the following parameters.
H: The hue value for the pixel (see FIGS. 20 and 21)
V: The brightness value for the pixel
$Hb_{mid}$=The middle hue value (240) in a target hue-region (B hue-region in this example), where the hue value H of the pixel falls (see FIG. 20)
$Hc_{mid}$: The middle hue value (180) in another hue-region (C hue-region, in this example) that is adjacent to the target hue-region on a side near the hue coordinate position of the hue value H of the pixel (see FIG. 20)
Vb': A B-region-dependent converted brightness value for the pixel, which is calculated by using the above-described equation 4 or 5 (the brightness correction table) for the B hue-region based on the brightness value V of the pixel
Vc': A C-region-dependent converted brightness value for the pixel, which is calculated by using the above-described equation 4 or 5 (the brightness correction table) for the C hue-region based on the brightness value v of the pixel $$V''=\{(H-Hc_{mid})\times Vb'+(Hb_{mid}-H)\times Vc'\}\div\{(Hb_{mid}-Hc_{mid})\}$$ (Equation 8)

Figure 21:
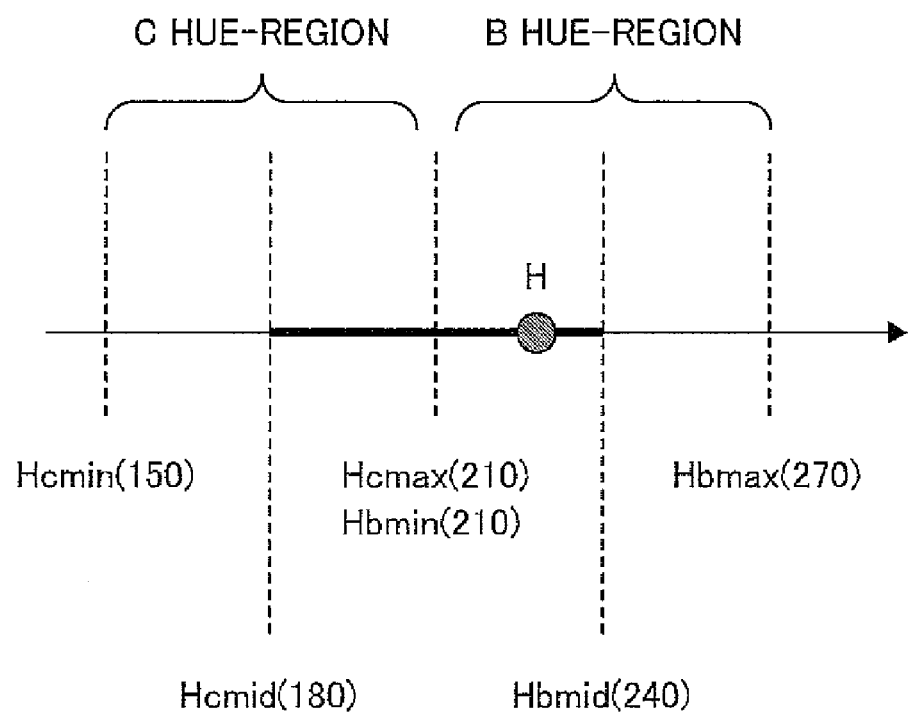
FIG. 21 is an explanatory diagram showing parts of the B hue-region and C hue-region targeted for conversion.

The above process is performed when the hue value H of the pixel in question is in the range of $Hc_{mid}$ (180) to $Hb_{mid}$ (240) as shown in FIGS. 20 and 21. By finding the output saturation value (S") and brightness value (V") through the above calculations weighted according to the input hue value H, it is possible to produce smooth correction effects between hues.

(13) Further, while the embodiments describe a multifunction device 10 as the image processing device, a data processor such as a personal computer may be used to perform image correction.

(14) In the second, third, and fourth embodiments, the multifunction device 10 displays corrected thumbnail image on the display section 32 showing the results of color conversion based on the sample images in S514. However, rather than displaying the corrected thumbnail image, the multifunction device 10 may perform a quick print of the corrected thumbnail image at low resolution, for example.

What is claimed is:

1. An image processing device comprising:
a first image inputting unit that is configured so as to be capable of inputting a plurality of first images;
a comprehensive first characteristic quantity data determining unit that determines comprehensive first characteristic quantity data based on the plurality of first images inputted by the first image inputting unit;
a second image inputting unit that is configured so as to be capable of inputting a second image;
a second characteristic quantity data determining unit that determines second characteristic quantity data expressing a characteristic of the second image inputted by the second image inputting unit;
an image correcting unit that corrects the second image based on the comprehensive first characteristic quantity data and the second characteristic quantity data,
a correction-result indicating image creating unit that creates a correction-result indicating image based on the plurality of first images and the second image, the correction- result indicating image indicating the second image corrected by the image correcting unit; and
an outputting unit that outputs the correction-result indicating image,
wherein, after the outputting unit outputs the correction-result indicating image, the first image inputting unit inputs another first image;
wherein the comprehensive first characteristic quantity data determining unit updates the comprehensive first characteristic quantity data based on the first images, based on which the correction-result indicating image is created, and the another first images; and
wherein the image correcting unit corrects the second image based on the updated comprehensive first characteristic quantity data and the second characteristic quantity data.

2. The image processing device according to claim 1, wherein the comprehensive first characteristic quantity data determining unit comprises:
a merging unit that merges the plurality of first images in a comprehensive first image; and
a determining unit that determines, as the first characteristic quantity data, characteristic quantity data expressing a characteristic of the comprehensive first image.

3. The image processing device according to claim 1, wherein the outputting unit is configured of a display unit that displays the second image corrected by the image correcting unit.

4. The image processing device according to claim 1, wherein the outputting unit is configured of a printing unit that prints the second image corrected by the image correcting unit.

5. The image processing device according to claim 1, further comprising a selecting unit that enables a user to select at least one of the plurality of first images after the outputting unit outputs the correction-result indicating image,
wherein the comprehensive first characteristic quantity data determining unit updates comprehensive first characteristic quantity data based on the plurality of first images, based on which the correction-result indicating image is created, except for the first image selected by the selecting unit, and
wherein the image correcting unit corrects the second image based on the updated comprehensive first characteristic quantity data and the second characteristic quantity data.

6. The image processing device according to claim 1, wherein the outputting unit further comprises a thumbnail image creating unit that creates a thumbnail image based on the second image, and creates the correction-result indicating image based on the thumbnail image and the plurality of first images.

7. The image processing device according to claim 1, wherein the image correcting unit corrects the second image according to a correcting value for each of a plurality of pixels constituting the second image, the correcting value being calculated based on the comprehensive first characteristic quantity data and the second characteristic quantity data.

8. An image processing device comprising:
a first image inputting unit that is configured so as to be capable of inputting a plurality of first images;
a comprehensive first characteristic quantity data determining unit that determines comprehensive first characteristic quantity data based on the plurality of first images inputted by the first image inputting unit;
a second image inputting unit that is configured so as to be capable of inputting a second image;

a second characteristic quantity data determining unit that determines second characteristic quantity data expressing a characteristic of the second image inputted by the second image inputting unit; and an image correcting unit that corrects the second image based on the comprehensive first characteristic quantity data and the second characteristic quantity data, wherein the comprehensive first characteristic quantity data determining unit comprises a first characteristic quantity data determining unit that determines a set of first characteristic quantity data expressing a characteristic of each first image, and a determining unit that determines the comprehensive first characteristic quantity data based on the plurality of sets of first characteristic quantity data of the plurality of first images, wherein the first characteristic quantity data determining unit comprises a first dividing unit that divides, for each first image, a plurality of pixels constituting the each first image into a plurality of classifications based on a prescribed classification criteria, wherein the first characteristic quantity data determining unit determines, for each first image, a first characteristic value for each classification, wherein the comprehensive first image quantity data determining unit further comprises a characteristic value selecting unit that selects, for each classification, one from among the characteristic values determined for all the classifications, and wherein the comprehensive first image quantity data determining unit determines the comprehensive first image quantity data based on the characteristic values selected for the plurality of classifications, wherein the second characteristic quantity data determining unit comprises a second dividing unit that divides a plurality of pixels constituting the second image into a plurality of classifications based on a prescribed classification criteria, wherein the second characteristic quantity data determining unit determines, as the second characteristic quantity data, a second characteristic value for each classification, and wherein the image correcting unit corrects the second image based on the comprehensive first characteristic quantity data and the second characteristic quantity data to change the characteristic of second image closer to a characteristic corresponding to the comprehensive first characteristic quantity data.

9. The image processing device according to claim 8, wherein the first characteristic quantity data determining unit determines the first characteristic quantity data for the plurality of first images based on at least a part of the each first image, and wherein the comprehensive first characteristic data determining unit further comprises a size determining unit that determines a size of the at least a part of each first image, thereby determining a plurality of sizes for the plurality of first images, respectively, wherein the determining unit determines the comprehensive first characteristic quantity data based on the plurality of first characteristic quantity data and the plurality of sizes determined by the size determining unit.

10. The image processing device according to claim 8, wherein the first characteristic data determining unit comprises a ratio-calculating unit that calculates, for each first image, a ratio of the first image occupied by the pixels belonging to each classification, and wherein the characteristic value selecting unit that selects, for each classification, the characteristic value corresponding to a first image that has the largest ratio occupied by pixels for the each classification, and wherein the comprehensive first image quantity data determining unit determines the comprehensive first image quantity data based on the characteristic values selected for all the classifications.

11. The image processing device according to claim 8, wherein the first characteristic data determining unit divides, based on hue values of the plurality of pixels, the plurality of pixels constituting each first image into the plurality of classifications, and wherein the second characteristic data determining unit divides, based on hue values of the plurality of pixels, the plurality of pixels constituting the second image into the plurality of classifications.

12. An image processing device comprising:
a first image inputting unit that is configured so as to be capable of inputting a plurality of first images;
a comprehensive first characteristic quantity data determining unit that determines comprehensive first characteristic quantity data based on the plurality of first images inputted by the first image inputting unit;
a second image inputting unit that is configured so as to be capable of inputting a second image;
a second characteristic quantity data determining unit that determines second characteristic quantity data expressing a characteristic of the second image inputted by the second image inputting unit; and
an image correcting unit that corrects the second image based on the comprehensive first characteristic quantity data and the second characteristic quantity data,
wherein the first image inputting unit inputs the first image optically read from a document placed in a prescribed reading position, and inputs a plurality of images independently from one another as a plurality of first images when the plurality of images are read from the document,
wherein the first image inputting unit inputs the plurality of images read in a plurality of scanning regions divided within the reading position as the plurality of first images, and
wherein the first image inputting unit further comprises a judging unit that judges whether the document is set in the reading position when a mean brightness of an image scanned in the scanning region is greater than or equal to a predetermined value.

13. A non-transitory computer-readable recording medium that stores an image processing program, the image processing program comprising instructions for:
inputting a plurality of first images;
determining comprehensive first characteristic quantity data based on the plurality of first images;
inputting a second image;
determining second characteristic quantity data expressing a characteristic of the second image;
correcting the second image based on the comprehensive first characteristic quantity data and the second characteristic quantity data,
creating a correction-result indicating image based on the plurality of first images and the second image, the correction-result indicating image indicating the second image corrected by the image correcting step;
outputting the correction-result indicating image, wherein, after outputting the correction- result indicating image, another first image is input, updating the comprehensive first characteristic quantity data based on the first images, based on which the correction-result indicating image is created, and the another first images, and correcting the second image based on the updated comprehensive first characteristic quantity data and the second characteristic quantity data.

14. A non-transitory computer-readable recording medium that stores an image processing program, the image processing program comprising instructions for:

inputting a plurality of first images;

determining comprehensive first characteristic quantity data based on the plurality of first images inputted by the first image inputting unit;

inputting a second image;

determining second characteristic quantity data expressing a characteristic of the second image; and correcting the second image based on the comprehensive first characteristic quantity data and the second characteristic quantity data, determining a set of first characteristic quantity data expressing a characteristic of each first image, determining the comprehensive first characteristic quantity data based on the plurality of sets of first characteristic quantity data of the plurality of first images, dividing, for each first image, a plurality of pixels constituting the each first image into a plurality of classifications based on a prescribed classification criteria, determining, for each first image, a first characteristic value for each classification, selecting, for each classification, one from among the characteristic values determined for all the classifications, determining the comprehensive first image quantity data based on the characteristic values selected for the plurality of classifications, dividing a plurality of pixels constituting the second image into a plurality of classifications based on a prescribed classification criteria, determining, as the second characteristic quantity data, a second characteristic value for each classification, and correcting the second image based on the comprehensive first characteristic quantity data and the second characteristic quantity data to change the characteristic of second image closer to a characteristic corresponding to the comprehensive first characteristic quantity data.

15. A non-transitory computer-readable recording medium that stores an image processing program, the image processing program comprising instructions for:

inputting a plurality of first images;

determining comprehensive first characteristic quantity data based on the plurality of first images inputted by the first image inputting unit;

inputting a second image;

determining second characteristic quantity data expressing a characteristic of the second image;

correcting the second image based on the comprehensive first characteristic quantity data and the second characteristic quantity data, inputting the first image optically read from a document placed in a prescribed reading position, and inputting a plurality of images independently from one another as a plurality of first images when the plurality of images are read from the document, inputting the plurality of images read in a plurality of scanning regions divided within the reading position as the plurality of first images, and judging whether the document is set in the reading position when a mean brightness of an image scanned in the scanning region is greater than or equal to a predetermined value.

* * * * *